(12) United States Patent
Kodama et al.

(10) Patent No.: US 8,332,115 B2
(45) Date of Patent: Dec. 11, 2012

(54) BRAKING APPARATUS

(75) Inventors: Shinya Kodama, Susono (JP); Kazuya Maki, Nagoya (JP)

(73) Assignees: Toyota Jidosha Kabushiki Kaisha, Toyota-shi (JP); Advics Co., Ltd., Kariya-shi (JP)

( * ) Notice: Subject to any disclaimer, the term of this patent is extended or adjusted under 35 U.S.C. 154(b) by 202 days.

(21) Appl. No.: 12/677,309

(22) PCT Filed: Jan. 8, 2009

(86) PCT No.: PCT/JP2009/050145
§ 371 (c)(1),
(2), (4) Date: Mar. 10, 2010

(87) PCT Pub. No.: WO2009/096209
PCT Pub. Date: Aug. 6, 2009

(65) Prior Publication Data
US 2010/0222978 A1 Sep. 2, 2010

(30) Foreign Application Priority Data
Jan. 31, 2008 (JP) ................................ 2008-021816

(51) Int. Cl.
G06F 7/70 (2006.01)
(52) U.S. Cl. ........................................................ 701/70
(58) Field of Classification Search ...................... 701/70
See application file for complete search history.

(56) References Cited

U.S. PATENT DOCUMENTS

| | | | | |
|---|---|---|---|---|
| 6,976,741 B2* | 12/2005 | Hara et al. | .................. | 303/113.1 |
| 2003/0182044 A1* | 9/2003 | Nakamura et al. | ............... | 701/70 |
| 2004/0054450 A1* | 3/2004 | Nakamura et al. | ............... | 701/22 |
| 2004/0122579 A1* | 6/2004 | Ashizawa et al. | ............... | 701/70 |
| 2007/0228821 A1* | 10/2007 | Maki et al. | ..................... | 303/151 |
| 2007/0228823 A1* | 10/2007 | Kokubo et al. | ............... | 303/155 |
| 2007/0255476 A1* | 11/2007 | Takamatsu | ....................... | 701/78 |
| 2007/0267915 A1* | 11/2007 | Shimada et al. | ............... | 303/122 |
| 2007/0272457 A1* | 11/2007 | Kodama et al. | ............... | 180/65.3 |
| 2007/0273204 A1* | 11/2007 | Kodama et al. | ............... | 303/146 |

(Continued)

FOREIGN PATENT DOCUMENTS

JP 2001-071880 3/2001

(Continued)

OTHER PUBLICATIONS

Decision of a Patent Grant mailed Sep. 11, 2012, in Japanese Patent Application No. 2008-021816, filed Jan. 31, 2008 (with English-language Translation), 2 pages.

Primary Examiner — James Trammell
Assistant Examiner — Truc M Do
(74) Attorney, Agent, or Firm — Oblon, Spivak, McClelland, Maier & Neustadt, L.L.P.

(57) ABSTRACT

A pressure braking unit including an operating pressure applying unit that applies an operating pressure to a working fluid according to operation of an operating member; a pressurizing unit that applies a pressurized pressure to the working fluid; a braking force generating unit that generates pressure braking force on wheels by a total pressure of the operating pressure and the pressurized pressure; a regenerative braking unit that generates regenerative braking force on the wheels; and a controlling unit that executes switching control to switch the regenerative braking force to the pressure braking force according to the pressurized pressure, and by prohibiting increase in the pressurized pressure by the pressurizing unit, it is possible to inhibit braking operation feeling from deteriorating while ensuring the braking force.

7 Claims, 7 Drawing Sheets

U.S. PATENT DOCUMENTS

| | | | |
|---|---|---|---|
| 2008/0255732 A1* | 10/2008 | Yasui et al. | 701/48 |
| 2009/0026835 A1* | 1/2009 | Matsubara et al. | 303/15 |
| 2010/0270854 A1* | 10/2010 | Okano et al. | 303/3 |

FOREIGN PATENT DOCUMENTS

| | | |
|---|---|---|
| JP | 2005 289290 | 10/2005 |
| JP | 2006 21745 | 1/2006 |
| JP | 2006-187081 | 7/2006 |
| JP | 2007-276534 | 10/2007 |
| JP | 2007 276550 | 10/2007 |
| JP | 2007 276655 | 10/2007 |
| JP | 2007-283836 | 11/2007 |
| JP | 2007 308005 | 11/2007 |
| JP | 2008 207683 | 9/2008 |

\* cited by examiner

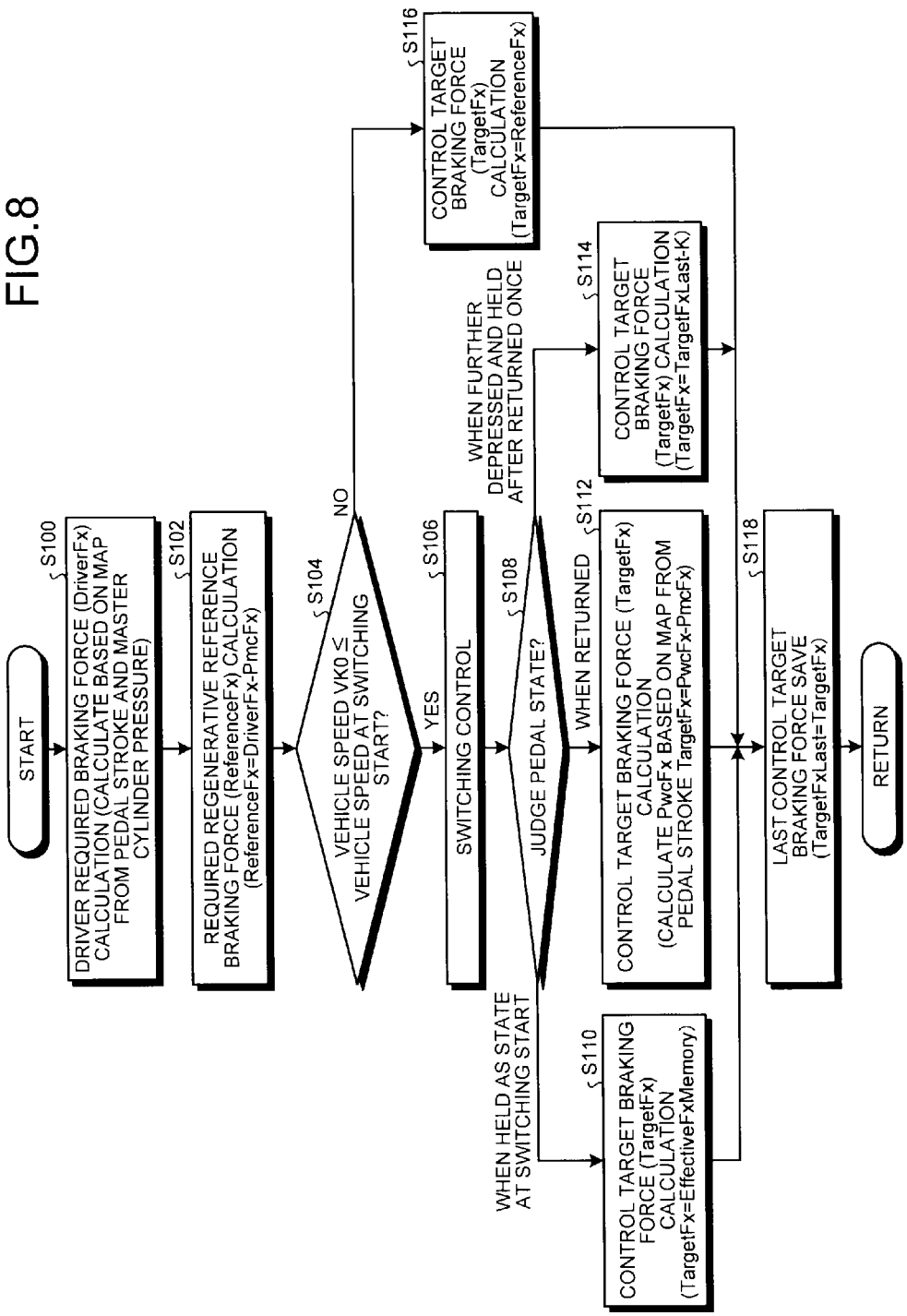

BRAKING APPARATUS

TECHNICAL FIELD

The present invention relates to a braking apparatus capable of outputting a master cylinder pressure generated by operating a brake pedal and a pressurized pressure generated by pressurizing a working fluid as pressure braking force, and especially relates to the braking apparatus enabling cooperative control of pressure braking and regenerative braking in a vehicle capable of traveling with an electric motor as a power source.

BACKGROUND ART

Conventionally, the braking apparatus capable of braking the vehicle during travel is provided on the vehicle, and the braking apparatus is to generate required braking force required by a driver to the braking apparatus by operation of the brake pedal by the driver in wheels of the vehicle. Such braking apparatus includes a so-called brake-by-wire system and an in-line system. There is the brake-by-wire system and the in-line system composed of a hydraulic brake system for generating the pressure braking force by action of a wheel cylinder pressure to a wheel cylinder, which allows a brake pad to contact a brake rotor, by application of the pressure to brake oil, which is the working fluid, according to the operation of the brake pedal operated by the driver, and a regenerative braking apparatus for generating regenerative braking force by performing the regenerative braking. The braking apparatuses generate the required braking force according to the operation of the brake pedal by the driver by the pressure braking force generated by the hydraulic brake apparatus and the regenerative braking force generated by the regenerative braking force.

The brake-by-wire system is, for example, to detect an amount of displacement according to the operation of the brake pedal operated by the driver such as a pedal stroke amount of the brake pedal by a stroke sensor, and drive a pressurizing pump provided on the hydraulic brake apparatus based on the detected pedal stroke amount, thereby allowing the wheel cylinder pressure to act on the wheel cylinder to generate the pressure braking force. That is to say, in the brake-by-wire system, the brake pedal and the hydraulic brake apparatus are not basically directly coupled to each other. Although such brake-by-wire type braking apparatus is capable of high-accuracy cooperative control, there is a problem that this is expensive.

On the other hand, the in-line system is to pressurize the brake oil by a master cylinder provided on the hydraulic brake apparatus, according to the operation of the brake pedal operated by the driver, and supply the brake oil stored in the reservoir to the wheel cylinder, thereby allowing a master cylinder pressure, which is the pressure of the master cylinder, to act on the wheel cylinder as the wheel cylinder pressure and generating the master pressure braking force based on the master cylinder pressure as the pressure braking force. That is to say, in the in-line system, the brake pedal and the hydraulic brake apparatus are basically directly coupled to each other. Also, the in-line system is provided with a pressurizing pump for further pressurizing the brake oil by the pump or the like to apply a pressurized pressure to the brake oil, for example, when the required braking force may not be generated by the pressure braking force generated by the wheel cylinder pressure acting on the wheel cylinder only by the pressurization of the brake oil by the master cylinder, that is to say, by a sum total of the master pressure braking force and the regenerative braking force. That is to say, the wheel cylinder pressure to act on the wheel cylinder is the total pressure of the master cylinder pressure and the pressurized pressure, and the generated pressure braking force is the sum total of the master pressure braking force and the pressurized braking force.

As such conventional in-line system braking apparatus, for example, a vehicle braking apparatus described in the Patent Document 1 is provided with a fluid-pressure braking apparatus capable of applying a control fluid pressure to be formed while driving the pump irrespective of the brake operation to the wheel cylinder and applying control fluid-pressure braking force to the wheel corresponding to the wheel cylinder, a regenerative brake apparatus for generating the regenerative braking force corresponding to a brake operating state detected by brake operating state detecting means for detecting a state of brake operation on the wheel by a motor for driving any of the wheels, and braking force compensating means for compensating deficiency of the braking force due to variation of the regenerative braking force. By doing this, the vehicle braking apparatus described in the Patent Document 1 makes the fluid-pressure brake apparatus smaller and light weight, and when the regenerative braking force by the regenerative brake apparatus varies, this compensates the deficiency of the braking force due to the variation by the fluid-pressure braking force by the fluid-pressure brake apparatus.

Patent Document 1: Japanese Patent Application Laid-open No. 2006-21745

DISCLOSURE OF INVENTION

Problem to be Solved by the Invention

Incidentally, although the in-line system braking apparatus such as the vehicle brake apparatus described in the above-described Patent Document 1 is not expensive, this returns the brake oil to the reservoir and inhales the brake oil from the master cylinder side in an early stage of the pressurization of the brake oil by the operation of the pump, so that there is a possibility that the feeling of the braking operation is deteriorated.

That is to say, for example, when a vehicle speed lowers from a braking state in which the driver required braking force is ensured by the pressure braking force according to the master cylinder pressure by brake pedal force and the regenerative braking force, the regenerative braking force gradually lowers, so that switching control to switch the regenerative braking force to the pressure braking force according to the pressurized pressure by the pump is executed by pressurizing the brake oil by operating the pump. That is to say, in the in-line system braking apparatus, it is required to increase or decrease the wheel cylinder pressure in order to increase or decrease the pressure braking force, and when a depression amount of the brake pedal by the driver is constant, the master pressure braking force according to the master cylinder pressure is constant, so that the pressurization of the brake oil by the pump is increased or decreased by controlling the pump. Then, in order to increase or decrease the pressurization of the brake oil by the pressurizing pump, the brake oil is returned to the reservoir or the brake oil is inhaled from the master cylinder side, so that shock due to variation of the hydraulic pressure might occur in the brake pedal basically directly coupled to the master cylinder, such as push back of the brake pedal to the driver side or pull-in of the same to the master cylinder side. As a result, the driver might feel discomfort in the operation of the brake pedal, so that the feeling of the braking operation might be deteriorated.

Then, an object of the present invention is to provide the braking apparatus capable of inhibiting the deterioration of the braking operation feeling while ensuring the braking force.

Means for Solving Problem

In order to solve the above mentioned problem, a braking apparatus according to the present invention, includes a pressure braking unit having an operating pressure applying unit that applies an operating pressure to a working fluid according to operation of an operating member, a pressurizing unit that pressurizes the working fluid to apply a pressurized pressure to the working fluid, and a braking force generating unit that generates pressure braking force on wheels of a vehicle by a total pressure of the operating pressure and the pressurized pressure; a regenerative braking unit that generates regenerative braking force on the wheels; and a controlling unit that executes switching control to switch the regenerative braking force to the pressure braking force according to the pressurized pressure, and, at the time of the switching control, reduces control target braking force, that is target braking force obtained by adding the regenerative braking force and the pressure braking force according to the pressurized pressure when the operating member is returned, and sets the control target braking force to be a value smaller than a last control target braking force when the operating member is held or further depressed after the operating member is returned, thereby prohibiting increase in the pressurized pressure by the pressurizing unit.

In the braking apparatus, it is preferred that the pressure braking unit increases the operating pressure when the operating member is further depressed after the operating member is returned at the time of the switching control.

In the braking apparatus, it is preferred that the braking apparatus further includes an operating amount detecting unit that detects an operating amount of the operating member; and an operating pressure detecting unit that detects the operating pressure, wherein the controlling unit sets the control target braking force based on a difference between the pressure braking force according to the total pressure allowed relative to a current operating amount of the operating member and the pressure braking force according to a current operating pressure, when the operating member is returned after start of the switching control.

Effect of the Invention

The braking apparatus according to the present invention is provided with a controlling means that reduces the control target braking force when the operating member is returned at the time of the switching control, sets the control target braking force to be a value smaller than the last control target braking force when the operating member is held or further depressed after the operating member is returned, and prohibits the increase in the pressurized pressure by the pressurizing means, so that it is possible to inhibit the braking operating feeling from deteriorating while ensuring the braking force.

BRIEF DESCRIPTION OF DRAWINGS

FIG. 8 is a flow chart for explaining brake control in the braking apparatus according to the embodiment of the present invention.

Figure 1:
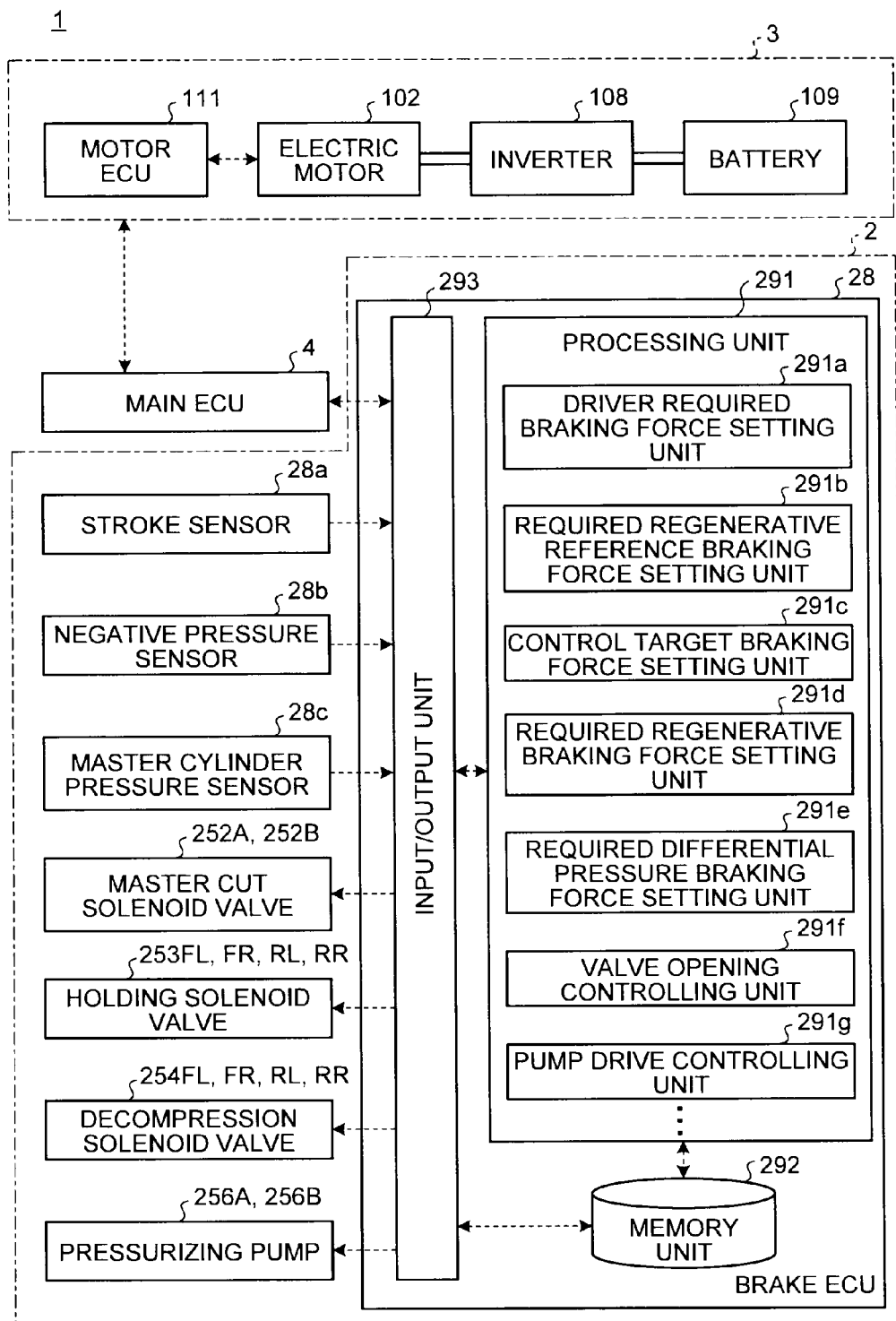
FIG. 1 is a schematic configuration diagram of a braking apparatus according to an embodiment of the present invention.

EXPLANATIONS OF LETTERS OR NUMERALS 1 braking apparatus
2 hydraulic brake apparatus (pressure braking means)
3 regenerative braking apparatus (regenerative braking means)
4 main ECU
21 brake pedal (operating member)
22 master cylinder (operating pressure applying means)
23 reservoir
24 brake booster
25 brake actuator (pressurizing means)
26FL, 26FR, 26RL, 26RR wheel cylinder
27FL, 27FR, 27RL, 27RR hydraulic braking unit (braking force generating means)
28 brake ECU (controlling means)
28a stroke sensor (operating amount detecting means)
28b negative pressure sensor
28c master cylinder pressure sensor (operating pressure detecting means)
100 hybrid vehicle (vehicle)
101 engine
102 electric motor
103 generator
104 power dividing mechanism
105 wheel
106 decelerator
107 drive shaft
108 inverter
109 battery
110 engine ECU
111 motor ECU
112 battery ECU
251A first hydraulic control circuit
251B second hydraulic control circuit
252A, 252B master cut solenoid valve
253FL, 253FR, 253RL, 253RR holding solenoid valve
254FL, 254FR, 254RL, 254RR decompression solenoid valve
255A, 255B reservoir
256A, 256B pressurizing pump
257A, 257B, 258A, 258B check valve
259 driving motor
271FL, 271FR, 271RL, 271RR brake pad 272FL, 272FR, 272RL, 272RR brake rotor
291a drive required braking force setting unit
291b required regenerative reference braking force setting unit
291c control target braking force setting unit
291d required regenerative braking force setting unit
291e required differential pressure braking force setting unit
291f valve opening controlling unit
291g pump drive controlling unit

BEST MODE(S) FOR CARRYING OUT THE INVENTION

Hereinafter, an embodiment of a braking apparatus according to the present invention is described in detail with reference to drawings. Meanwhile, the present invention is not limited by the embodiment. Also, components in the following embodiment include the components easily replaceable by one skilled in the art, or substantially identical components.

EMBODIMENT

Figure 2:
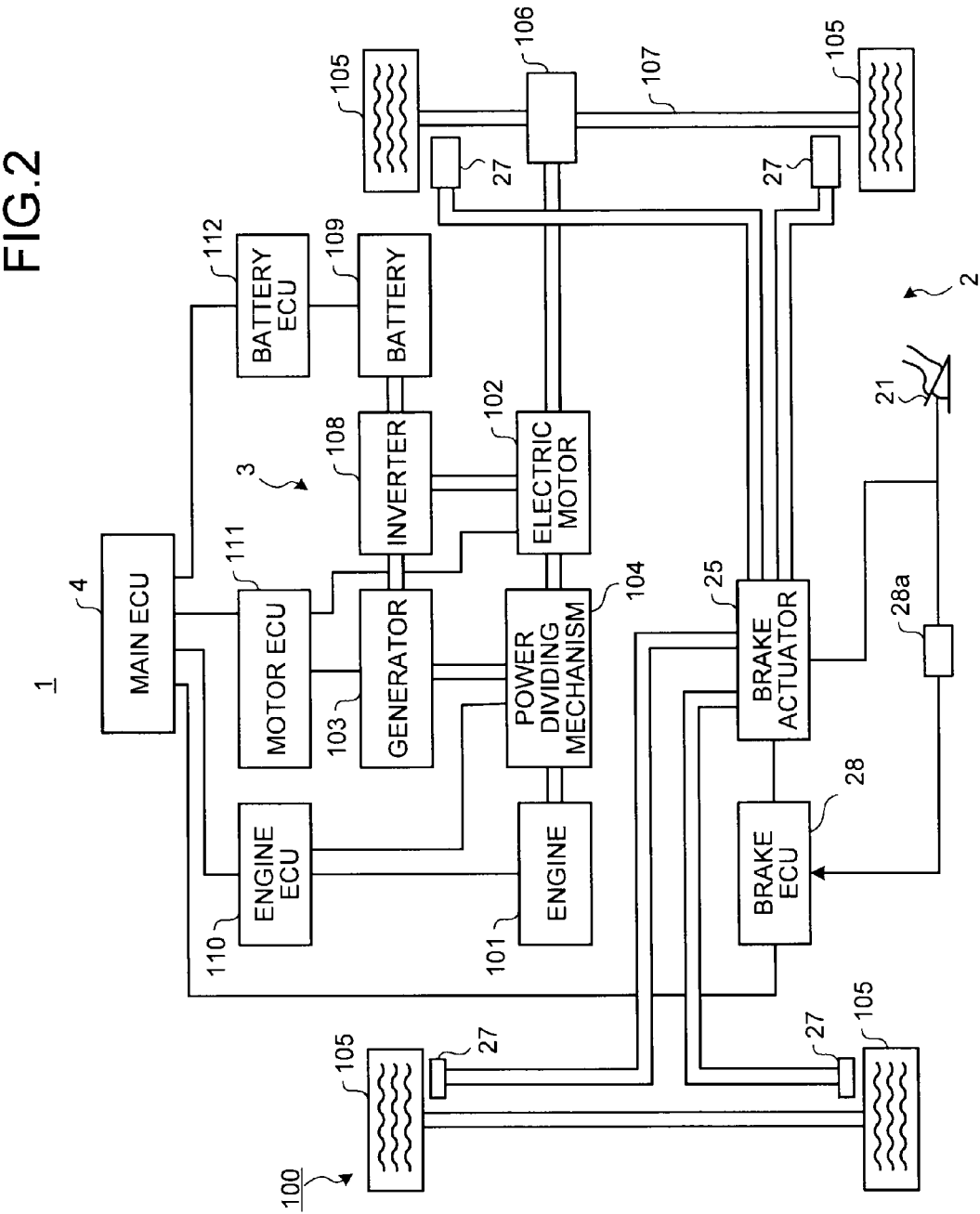
FIG. 2 is a schematic configuration diagram showing a hybrid vehicle to which the braking apparatus according to the embodiment of the present invention is applied.
Figure 3:
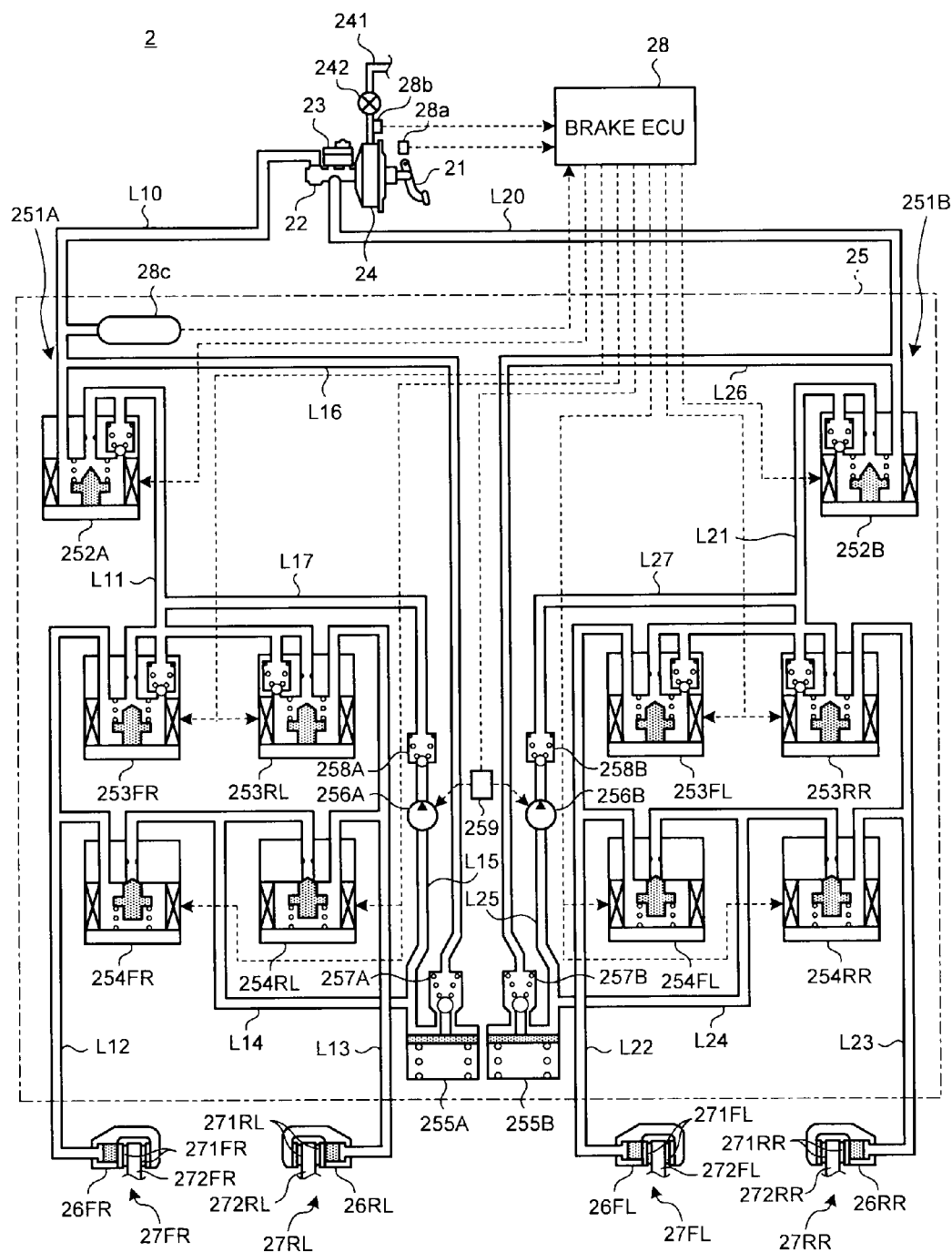
FIG. 3 is a schematic configuration diagram showing a hydraulic brake apparatus, which the braking apparatus according to the embodiment of the present invention provides.
Figure 4:
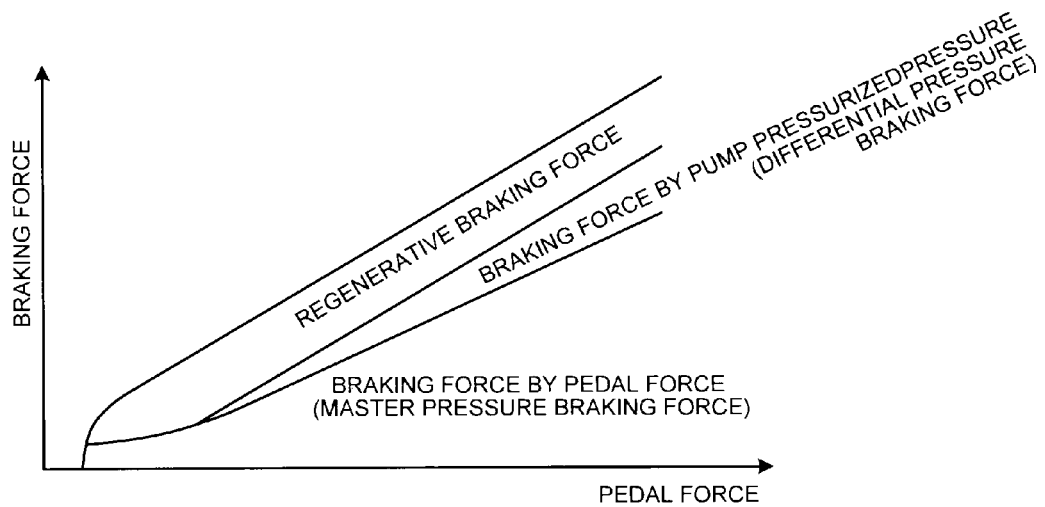
FIG. 4 is a graph showing braking force relative to brake pedal force in the braking apparatus according to the embodiment of the present invention.
Figure 5:
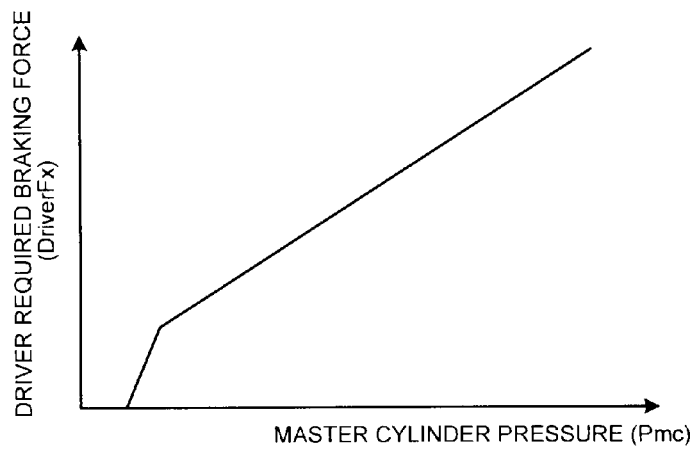
FIG. 5 is a graph showing driver required braking force relative to a master cylinder pressure in the braking apparatus according to the embodiment of the present invention.
Figure 6:
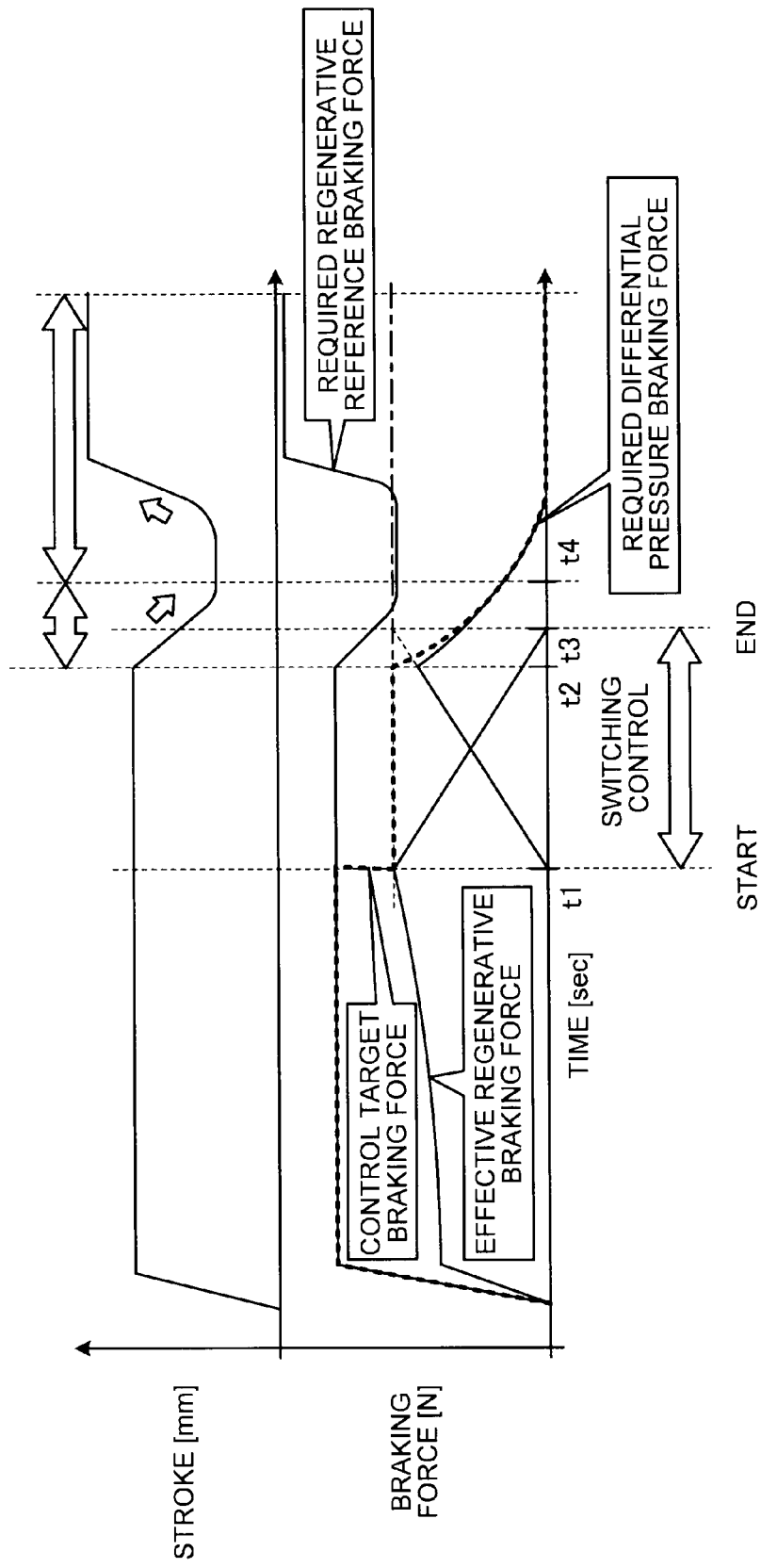
FIG. 6 is a time chart for explaining switching control of the braking force in the braking apparatus according to the embodiment of the present invention.
Figure 7:
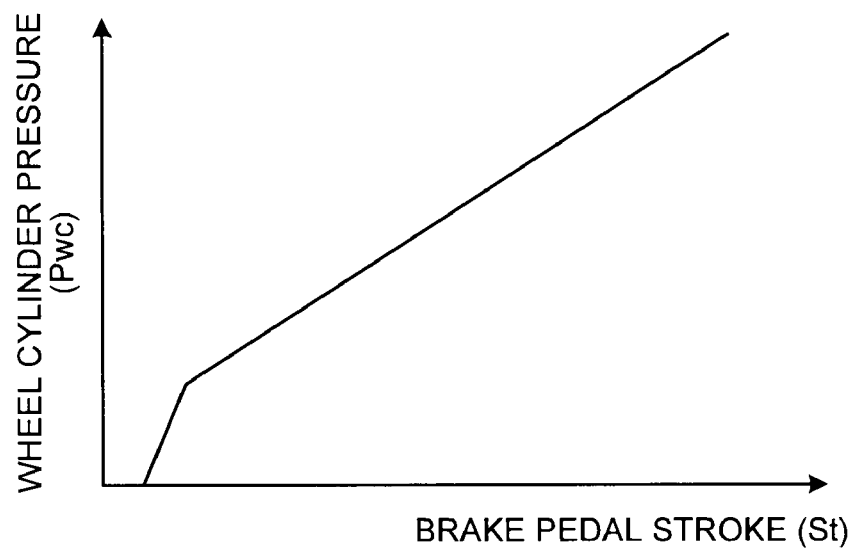
FIG. 7 is a graph showing a brake pedal stroke relative to a wheel cylinder pressure in the braking apparatus according to the embodiment of the present invention.

FIG. 1 is a schematic configuration diagram of the braking apparatus according to the embodiment of the present invention, FIG. 2 is a schematic configuration diagram showing a hybrid vehicle to which the braking apparatus according to the embodiment of the present invention is applied, FIG. 3 is a schematic configuration diagram showing a hydraulic brake apparatus provided on the braking apparatus according to the embodiment of the present invention, FIG. 4 is a graph showing braking force relative to brake pedal force in the braking apparatus according to the embodiment of the present invention, FIG. 5 is a graph showing driver required braking force relative to a master cylinder pressure in the braking apparatus according to the embodiment of the present invention, FIG. 6 is a time chart for explaining switching control of the braking force in the braking apparatus according to the embodiment of the present invention, FIG. 7 is a graph showing a brake pedal stroke relative to a wheel cylinder pressure in the braking apparatus according to the embodiment of the present invention, and FIG. 8 is a flowchart for explaining brake control in the braking apparatus according to the embodiment of the present invention.

A braking apparatus 1 according to this embodiment is mounted on a vehicle such as a passenger vehicle and a truck, as shown in FIGS. 1 to 3, in which a hydraulic brake apparatus 2 formed of brake pads 271FL, 271FR, 271RL and 271RR, brake rotors 272FL, 272FR, 272RL and 272RR and the like arranged on each wheel of the vehicle, and a regenerative braking apparatus 3 are to generate braking force (braking torque) on each wheel 105 of the vehicle, according to braking operation of the driver. That is to say, in the braking apparatus 1, the hydraulic brake apparatus 2 and the regenerative braking apparatus 3 generate pressure braking force and regenerative braking force, respectively.

The braking apparatus 1 is composed of the hydraulic brake apparatus 2 as pressure braking means, the regenerative braking apparatus 3 as regenerative braking means, and a main ECU 4 as a hybrid braking apparatus, as shown in FIG. 1, and is mounted on the hybrid vehicle 100. The main ECU 4 as the hybrid braking apparatus is to control the operation of the hybrid vehicle 100 in a comprehensive manner.

The hybrid vehicle 100 to which the braking apparatus 1 is applied is provided with an engine 101, an electric motor 102, a generator 103, a power dividing mechanism 104, wheels 105, a decelerator 106, a drive shaft 107, an inverter 108, and a battery 109.

That is to say, the hybrid vehicle 100 is equipped with the engine 101 and the electric motor 102 as power sources. In addition, the hybrid vehicle 100 is also equipped with the generator 103 for generating electric power by receiving an output of the engine 101. The engine 101, the electric motor 102 and the generator 103 are connected by the power dividing mechanism 104. The power dividing mechanism 104 divides the output of the engine 101 to the generator 103 and the wheels 105 and transmits the output from the electric motor 102 to the wheels 105, and this serves as a transmission regarding driving force transmitted to the wheels 105 through the decelerator 106 and the drive shaft 107.

The electric motor 102 is an AC synchronous motor and is driven by AC power. The inverter 108 is to convert the electric power stored in the battery 109 from DC to AC to supply to the electric motor 102, and to convert the electric power generated by the generator 103 from AC to DC to store in the battery 109. The generator 103 also has the configuration basically substantially similar to that of the above-described electric motor 102, and has the configuration as the AC synchronous motor. In this case, while the electric motor 102 mainly outputs the driving force, the generator 103 is mainly to generate electric power by receiving the output of the engine 101.

Also, although the electric motor 102 mainly generates the driving force, this can generate the electric power by utilizing rotation of the wheels 105 (regenerative electric power generation), and this can serve as the generator. At that time, since a regenerative brake (regenerative braking force) acts on the wheels 105, it is possible to put a brake on the hybrid vehicle 100 by using the same together with a foot brake and an engine brake. That is to say, the electric motor 102 corresponds to a part of the regenerative braking apparatus 3 as the regenerative braking means of the present invention for generating the regenerative braking force on the wheels 105 as shown in FIG. 1, and generates the regenerative braking force on the drive shaft 107 based on rotational force of the wheels 105. The regenerative braking apparatus 3 is mainly composed of the electric motor 102, the inverter 108, the battery 109, a motor ECU 111 and the like. On the other hand, although the generator 103 mainly generates the electric power by receiving the output of the engine 101, this can serve as the motor, which drives by receiving the electric power of the battery 109 by means of the inverter 108.

Meanwhile, a crank position sensor (not shown) for detecting a piston position and an engine rotational number is provided on the engine 101, and output a detection result to the engine ECU 110. Also, a rotational number sensor (not shown) for detecting a rotational position and a rotational number is provided on the electric motor 102 and the generator 103 to output the detection result to the motor ECU 111.

The above-described various controls of the hybrid vehicle 100 are controlled by a plurality of electronic controlling units (ECUs). The drive by the engine 101 and the drive by the electric motor 102, which are characteristic of the hybrid vehicle, are controlled by the main ECU 4 as the hybrid braking apparatus in a comprehensive manner. That is to say, in the hybrid vehicle 100, distribution of the output of the engine 101 and the output of the electric motor 102 is determined by the main ECU 4, and control commands are output to the engine ECU 110 and the motor ECU 111 to control the engine 101, the electric motor 102 and the generator 103.

The engine ECU 110 and the motor ECU 111 output information of the engine 101, the electric motor 102 and the generator 103 also to the main ECU 4. The main ECU 4 is also connected to a battery ECU 112 for controlling the battery 109. The battery ECU 112 monitors a state of charge of the battery 109 and when an amount of charge is not sufficient, this outputs a charge request command to the main ECU 4. The main ECU 4, which receives the charge request, controls to allow the generator 103 to generate the electric power in order to charge the battery 109.

Also, a hydraulic braking unit 27 as braking force generating means of the hydraulic brake apparatus 2 to be described later is provided on the hydraulic vehicle 100 so as to correspond to the wheels 105. It is configured that the hydraulic braking unit 27 is supplied with an adjusted braking hydraulic pressure from a brake actuator 25 to be described later. A brake ECU 28 for controlling the brake actuator 25 is also connected to the above-described main ECU 4.

Since the hybrid vehicle 100 is configured as described above, it is possible to also satisfy the output required by an entire vehicle while controlling an operating state of the engine 101 to a desired operating state by dividing a required output required by the entire vehicle during travel of the hybrid vehicle 100 to the engine 101 and to the electric motor 102 (generator 103).

Therefore, the main ECU 4 controls the engine 101 by means of the engine ECU 110 and controls the electric motor 102 and the generator 103 by means of the motor ECU 111, according to the requirement of the driver. That is to say, the main ECU 4 sets the required output from accelerator opening, the distribution of the output of the engine 101 and the output of the electric motor 102 is determined such that maximum efficiency may be obtained according to a travel-stopping state of the vehicle, and the engine ECU 110 and the motor ECU 111 control the engine 101 and the electric motor 102, respectively.

For example, at the time of start and during the travel at a low or medium speed of the hybrid vehicle 100, in a range in which engine efficiency is deteriorated, fuel is cut or the engine 101 is stopped and the wheels 105 are driven only by the electric motor 102 to travel (energy saving travel). At the time of normal travel, the output of the engine 101 is divided by the power dividing mechanism 104 in which the one is transmitted to the generator 103 to generate the electric power and the electric motor 102 is driven by the electric power to drive the wheels 105, and the other directly drives the wheels 105, thereby traveling by the engine 101 and the electric motor 102. At the time of rapid acceleration (at the time of high load), the electric motor 102 drives the wheels 105 to travel by receiving the electric power from the battery 109 in addition to the control at the time of the normal travel. At the time of deceleration and braking, the electric motor 102 is driven by the wheels 105 and the electric motor 102 is allowed to operate as the generator and to act as the regenerative brake, and the battery 109 is charged with recovered electric power. At the time of battery charge, the output of the engine 101 is transmitted to the generator 103 through the power dividing mechanism 104 to generate the electric power, and the electric power is stored in the battery 109.

Then, the engine ECU 110 determines a fuel injection amount, injection timing, ignition timing and the like based on an engine operating state such as an intake air mass, throttle opening, the engine rotational number, a cooled water temperature, in addition to the engine output distribution from the main ECU 4, thereby controlling an injector and an ignition plug of the engine 101.

Next, the hydraulic brake apparatus 2 is to compose an in-line system as shown in FIG. 3, and to generate pressure braking force. The hydraulic brake apparatus 2 is composed of a brake pedal 21 as an operating member, a master cylinder 22 as operating pressure applying means, a reservoir 23, a brake booster 24, a brake actuator 25 as pressurizing means, wheel cylinders 26FL, 26FR, 26RL and 26RR, hydraulic braking units 27FL, 27FR, 27RL and 27RR as the braking force generating means, and the above-described brake ECU 28.

Herein, in the hydraulic brake apparatus 2, a hydraulic path from the master cylinder 22 to each of the wheel cylinders 26FL, 26FR, 26RL and 26RR through the brake actuator 25 is filled with brake oil, which is a working fluid. In the hydraulic brake apparatus 2, basically, the operating pressure is applied to the brake oil by the master cylinder 22 according to a pedal force acting on the brake pedal 21 by the operation of the brake pedal 21 by the driver, and master pressure braking force is generated as the pressure braking force by the action of the operating pressure, that is to say, a master cylinder pressure Pmc on each of the wheel cylinders 26FL, 26FR, 26RL and 26RR as a wheel cylinder pressure Pwc.

Specifically, the brake pedal 21 is the operating member operated by the driver to brake, and is to be operated when the driver generates the braking force on the hybrid vehicle 100, that is to say, operated by a brake requirement. The brake pedal 21 is a portion with which the driver boarding on the vehicle inputs the pedal force with his/her foot as the braking operation. The brake pedal 21 has a tread portion, and is provided so as to be rotatable about a rotational axis when the pedal force is input on the tread portion.

The master cylinder 22 is the operating pressure applying means and is driven according to depressing operation of the brake pedal 21 by the driver. The master cylinder 22 is to pressurize the brake oil, which is the working fluid, when the pedal force is input to the brake pedal 21, thereby applying the master cylinder pressure Pmc as the operating pressure. The master cylinder 22 pressurizes the brake oil by a piston not shown with which the pedal force acting on the brake pedal 21 is applied by the depression on the brake pedal 21 by the driver. That is to say, in the master cylinder 22, the piston is movable by the pedal force transmitted through the brake pedal 21 by the operation by the driver, and the master cylinder pressure Pmc, which is the braking hydraulic pressure according to the pedal force, may be output by the movement of the piston. In the master cylinder 22, two internal hydraulic chambers are filled with the brake oil used as the working fluid, and the pedal force input by means of the brake pedal 21 is converted to the master cylinder pressure Pmc, which is a liquid pressure (hydraulic pressure) of brake liquid, by the hydraulic chamber and the piston according to the braking operation of the brake pedal 21.

The reservoir 23 is coupled to the master cylinder 22, and the brake oil is stored therein.

The brake booster 24 is a vacuum booster for redoubling (amplifying) the pedal force acting on the brake pedal 21 by the depression on the brake pedal 21 by the driver with a predetermined boost ratio by a negative pressure generated by the engine 101 (refer to FIG. 2) to transmit to the piston of the master cylinder 22. The brake booster 24 is integrally attached to the master cylinder 22, and is connected to an air intake path of the engine 101 through a negative pressure pipe 241 and a check valve 242. The brake booster 24 amplifies the pedal force by force acting on a diaphragm not shown by differential pressure between the negative pressure generated in the air intake path of the engine 101 and an outside atmospheric pressure.

The brake booster 24 can energize the pedal force input from the brake pedal 21 and transmitted through an operating rod by difference between the negative pressure introduced from the air intake path of the engine 101 through the negative pressure pipe 241 and the atmospheric pressure to transmit to the master cylinder 22. That is to say, the brake booster 24 can energize the pedal force when operating the brake pedal 21 to brake by the negative pressure and energize the pedal force input to the master cylinder 22 relative to the pedal force input to the brake pedal 21, thereby reducing the pedal force to the brake pedal 21 by the driver.

Then, the master cylinder 22 pressurizes the brake oil according to the pedal force acting on the brake pedal 21 amplified by the brake booster 24, thereby applying the master cylinder pressure Pmc as the operating pressure to the brake oil. That is to say, the brake booster 24 composes a part of the operating pressure applying means, that is to say, the master cylinder pressure Pmc as the operating pressure is that based on the pedal force by the driver and the negative pressure of the engine 101 (refer to FIG. 2).

The brake actuator 25 is pressurizing means for controlling the wheel cylinder pressure Pwc acting on each of the wheel cylinders 26FL, 26FR, 26RL and 26RR according to the master cylinder pressure Pmc applied to the brake oil by the master cylinder 22, or allowing the wheel cylinder pressure Pwc to act on each of the wheel cylinders 26FL, 26FR, 26RL and 26RR regardless of whether the master cylinder pressure Pmc is applied to the brake oil by the master cylinder 22.

Herein, in the master cylinder 22, the internal two hydraulic chambers not shown are provided as described above, and the above-described master cylinder pressure Pmc is generated in each of the hydraulic chambers. In the master cylinder 22, hydraulic pipes L10 and L20 connected to each of the hydraulic chambers, respectively, are provided.

The brake actuator 25 is provided as a working fluid pressure adjusting unit for transmitting the hydraulic pressure (master cylinder pressure Pmc) in the hydraulic pipe (first hydraulic pipe) L10 and the hydraulic pipe (second hydraulic pipe) L20 directly or by adjusting to each of the wheel cylinders 26FL, 26FR, 26RL and 26RR to be described later, according to a control command of the brake ECU 28.

The brake actuator 25 of this embodiment is provided with a first hydraulic control circuit 251A for a right front wheel and a left rear wheel and a second hydraulic control circuit 251B for a right rear wheel and a left front wheel as circuits for transmitting the hydraulic pressure from the master cylinder 22 to the wheel cylinders 26FL, 26FR, 26RL and 26RR. Herein, the first hydraulic control circuit 251A is connected to the hydraulic pipe L10, on the other hand, the second hydraulic control circuit 251B is connected to the hydraulic pipe L20.

The brake actuator 25 is composed of master cut solenoid valves 252A and 252B, holding solenoid valves 253FL, 253FR, 253RL and 253RR, decompression solenoid valves 254FL, 254FR, 254RL and 254RR, reservoirs 255A and 255B, pressurizing pumps 256A and 256B, check valves 257A, 257B, 258A and 258B, a driving motor 259, and hydraulic pipes L10 to L17 and L20 to L27. Herein, the hydraulic pipes L10 to L17 compose the first hydraulic control circuit 251A, on the other hand, the hydraulic pipes L20 to L27 compose the second hydraulic control circuit 251B.

Each of the master cut solenoid valves 252A and 252B is pressure-adjusting means composing pressurizing means (in other words, flow amount adjusting means of the brake oil), for adjusting a pressurized pressure Pp.

The master cut solenoid valve 252A is provided on the first hydraulic control circuit 251A and is connected to the hydraulic pipes L10 and L11. The master cut solenoid valve 252A allows the hydraulic pipes L10 and L11 to communicate with each other, cancels the communication, and adjusts the differential pressure between an upstream side and a downstream side of the master cut solenoid valve 252A at the time of communication by adjusting a flow amount of the brake oil. That is to say, the master cut solenoid valve 252A is to adjust the differential pressure between the pressure of the brake oil pressurized by the pressurizing pump 256A to be described later and the master cylinder pressure Pmc as the pressurized pressure Pp.

The master cut solenoid valve 252B is provided on the second hydraulic control circuit 251B and is connected to the hydraulic pipes L20 and L21. The master cut solenoid valve 252B allows the hydraulic pipes L20 and L21 to communicate with each other, cancels the communication, and adjusts the differential pressure between an upstream side and a downstream side of the master cut solenoid valve 252B at the time of communication by adjusting the flow amount of the brake oil. That is to say, the master cut solenoid valve 252B adjusts the differential pressure between the pressure of the brake oil pressurized by the pressurizing pump 256B to be described later and the master cylinder pressure Pmc as the pressurized pressure Pp.

Also, the check valve is provided on each of the master cut solenoid valves 252A and 252B. The check valve of each of the master cut solenoid valves 252A and 252B allows only the flow of the brake oil from sides of the hydraulic pipes L10 and L20 to sides of the hydraulic pipes L11 and L21, respectively.

Then, the master cut solenoid valves 252A and 252B are so-called normal-open type linear solenoid valves, which are in an opened state at a normal time in which current is not supplied, and are electrically connected to the brake ECU 28. Therefore, in each of the master cut solenoid valves 252A and 252B, the current to be supplied is controlled based on a command current value from the brake ECU 28, and opening control to control the opening is performed. That is to say, the master cut solenoid valves 252A and 252B adjust the pressurized pressure Pp by adjusting the flow amount of the brake oil derived from the master cylinder 22 by controlling the valve opening according to the command current value.

The holding solenoid valve 253FR is provided on the first hydraulic control circuit 251A and is connected to the hydraulic pipe L11 connected to the master cylinder 22 through the master cut solenoid valve 252A and the hydraulic pipe L10, and to a hydraulic pipe L12 connected to the wheel cylinder 26FR. The holding solenoid valve 253FR is to allow the hydraulic pipes L11 and L12 to communicate with each other, and cancel the communication. That is to say, the holding solenoid valve 253FR is to connect the master cylinder 22 and the wheel cylinder 26FR and cancel the connection.

The holding solenoid valve 253RL is provided on the first hydraulic control circuit 251A and is connected to the hydraulic pipe L11 connected to the master cylinder 22 through the master cut solenoid valve 252A and the hydraulic pipe L10, and to a hydraulic pipe L13 connected to the wheel cylinder 26RL. The holding solenoid valve 253RL is to allow the hydraulic pipes L11 and L13 to communicate with each other and cancel the communication. That is to say, the holding solenoid valve 253RL is to connect the master cylinder 22 and the wheel cylinder 26RL and cancel the connection.

The holding solenoid valve 253FL is provided on the second hydraulic control circuit 251B and is connected to the hydraulic pipe L21 connected to the master cylinder 22 through the master cut solenoid valve 252B and the hydraulic pipe L20, and to the hydraulic pipe L22 connected to the wheel cylinder 26FL. The holding solenoid valve 253FL is to allow the hydraulic pipes L21 and L22 to communicate with each other and cancel the communication. That is to say, the holding solenoid valve 253FL is to connect the master cylinder 22 and the wheel cylinder 26FL and cancel the connection.

The holding solenoid valve 253RR is provided on the second hydraulic control circuit 251B and is connected to the hydraulic pipe L21 connected to the master cylinder 22 through the master cut solenoid valve 252B and the hydraulic pipe L20 and to the hydraulic pipe L23 connected to the wheel cylinder 26RR. The holding solenoid valve 253RR is to allow the hydraulic pipes L21 and L23 to communicate with each other and cancel the communication. That is to say, the holding solenoid valve 253RR is to connect the master cylinder 22 and the wheel cylinder 26RR and cancel the connection.

Each of the holding solenoid valves 253FL, 253FR, 253RL and 253RR is a so-called normal-open type solenoid valve, which is in the opened state at the normal time in which the current is not supplied, and is electrically connected to the brake ECU 28. Therefore, opening and closing of each of the holding solenoid valves 253FL, 253FR, 253RL and 253RR is controlled by on/off control by the brake ECU 28. That is to say, each of the holding solenoid valves 253FL, 253FR, 253RL and 253RR is brought into an energizing state when being turned on by the brake ECU 28, and is fully closed at the time of energization. On the other hand, each of the valves is brought into a non-energizing state when being turned off by the brake ECU 28 and is fully opened at the time of non-energization.

Also, the check valve for returning the brake oil to an upstream side of each of the holding solenoid valves 253FL, 253FR, 253RL and 253RR (sides of the hydraulic pipes L11 and L21) when a total pressure acting on each of the wheel cylinders 26FL, 26FR, 26RL and 26RR at the time of energization, that is to say, the wheel cylinder pressure Pwc, is higher than the pressure of the brake oil in the hydraulic pipes L11 and L21, is provided on each of the holding solenoid valves 253FL, 253FR, 253RL and 253RR. The check valve of each of the holding solenoid valves 253FL, 253FR, 253RL and 253RR allows only the flow of the brake oil from sides of the wheel cylinders 26FL, 26FR, 26RL and 26RR to sides of the master cut solenoid valves 252A and 252B, respectively.

The decompression solenoid valve 254FR is provided on the first hydraulic control circuit 251A and is connected to the hydraulic pipe L12 connected to the wheel cylinder 26FR and the hydraulic pipe (hydraulic exhaust path) L14 connected to the reservoir 255A. The decompression solenoid valve 254FR is to allow the hydraulic pipes L12 and L14 to communicate with each other and cancel the communication. That is to say, the decompression solenoid valve 254FR is to connect the wheel cylinder 26FR and the reservoir 255A and cancel the connection.

The decompression solenoid valve 254RL is provided on the first hydraulic control circuit 251A and is connected to the hydraulic pipe L13 connected to the wheel cylinder 26RL and the hydraulic pipe L14 connected to the reservoir 255A. The decompression solenoid valve 254RL is to allow the hydraulic pipes L13 and L14 to communicate with each other and cancel the communication. That is to say, the decompression solenoid valve 254RL is to connect the wheel cylinder 26RL and the reservoir 255A and cancel the connection.

The decompression solenoid valve 254FL is provided on the second hydraulic control circuit 251B and is connected to the hydraulic pipe L22 connected to the wheel cylinder 26FL and the hydraulic pipe (hydraulic exhaust path) L24 connected to the reservoir 255B. The decompression solenoid valve 254FL is to allow the hydraulic pipes L22 and L24 to communicate with each other and cancel the communication. That is to say, the decompression solenoid valve 254FL is to connect the wheel cylinder 26FL and the reservoir 255B and cancel the connection.

The decompression solenoid valve 254RR is provided on the second hydraulic control circuit 251B and is connected to the hydraulic pipe L23 connected to the wheel cylinder 26RR and the hydraulic pipe L24 connected to the reservoir 255B. The decompression solenoid valve 254RR is to allow the hydraulic pipes L23 and L24 to communicate with each other and cancel the communication. That is to say, the decompression solenoid valve 254RR is to connect the wheel cylinder 26RR and the reservoir 255B and cancel the connection.

Each of the decompression solenoid valves 254FL, 254FR, 254RL and 254RR is a so-called normal-close type solenoid valve, which is in a closed state at the normal time in which the current is not supplied, and is electrically connected to the brake ECU 28. Therefore, the opening and closing of each of the decompression solenoid valves 254FL, 254FR, 254RL and 254RR is controlled by the on/off control by the brake ECU 28. That is to say, each of the decompression solenoid valves 254FL, 254FR, 254RL and 254RR is brought into the energizing state when being turned on by the brake ECU 28 and is fully opened at the time of energization. On the other hand, each of the valves is brought into the non-energizing state when being turned off by the brake ECU 28 and is fully closed at the time of non-energization.

The reservoir 255A is provided on the first hydraulic control circuit 251A and is connected to the hydraulic pipe L14, a hydraulic pipe L15 connected to the pressurizing pump 256A and the hydraulic pipe (intake path) L16 communicating with the hydraulic pipe L10 through the check valve 257A for reservoir cut. Therefore, the brake oil exhausted from the decompression solenoid valves 254FR and 254RL through the hydraulic pipe L14 or the brake oil inhaled from the hydraulic pipe L10, that is to say, the upstream side of the master cut solenoid valve 252A through the hydraulic pipe L16 can be introduced into the reservoir 255A.

The reservoir 255B is provided on the second hydraulic control circuit 251B and is connected to the hydraulic pipe L24, the hydraulic pipe L25 connected to the pressurizing pump 256B and the hydraulic pipe (intake path) L26 communicating with the hydraulic pipe L20 through the check valve 257B for reservoir cut. Therefore, the brake oil exhausted from the decompression solenoid valves 254FL and 254RR through the hydraulic pipe L24 or the brake oil inhaled from the hydraulic pipe L20, that is to say, the upstream side of the master cut solenoid valve 252B through the hydraulic pipe L26 can be introduced into the reservoir 255B.

The pressurizing pump 256A is provided on the first hydraulic control circuit 251A and is connected to the hydraulic pipe L15 connected to the reservoir 255A and the hydraulic pipe (pump path) L17 communicating with the hydraulic pipe L11 through the check valve 258A. Therefore, the pressurizing pump 256A is to suck the brake oil on the upstream side of the master cut solenoid valve 252A through the hydraulic pipe L16 and the reservoir 255A and pressurize the same to discharge to the hydraulic pipe L11, that is to say, the downstream side of the master cut solenoid valve 252A.

The pressurizing pump 256B is provided on the second hydraulic control circuit 251B and is connected to the hydraulic pipe L25 connected to the reservoir 255B and the hydraulic pipe (pump path) L27 communicating with the hydraulic pipe L21 through the check valve 258B. Therefore, the pressurizing pump 256B is to suck the brake oil on the upstream side of the master cut solenoid valve 252B through the hydraulic pipe L26 and the reservoir 255B, and pressurize the same to discharge to the hydraulic pipe L21, that is to say, the downstream side of the master cut solenoid valve 252B.

Herein, each of the pressurizing pumps 256A and 256b is driven by the driving motor 259. The driving motor 259 is connected to the brake ECU 28. Therefore, each of the pressurizing pumps 256A and 256B is drive-controlled by the drive control of the driving motor 259 by the brake ECU 28.

As described above, the brake actuator 25 as the pressurizing means is to apply the pressurized pressure Pp to the brake oil by pressurizing the brake oil by each of the pressurizing pumps 256A and 256B and adjusting the differential pressure between the pressure of the pressurized brake oil and the master cylinder pressure by each of the master cut solenoid valves 252A and 252B.

Herein, operation of the brake actuator 25 is described continuously with reference to FIG. 3.

The brake actuator 25 is controlled by the brake ECU 28 such that each of the master cut solenoid valves 252A and 252B is in the non-energizing state, each of the holding solenoid valves 253FL, 253FR, 253RL and 253RR is in the non-energizing state, each of the decompression solenoid valves 254FL, 254FR, 254RL and 254RR is in the non-energizing state, and each of the pressurizing pumps 256A and 256B is in a non-driving state in a booster mode. That is to say, in the booster mode of the brake actuator 25, the master cylinder 22 and each of the wheel cylinders 26FL, 26FR, 26RL and 26RR are connected through the hydraulic pipes L10 and L20, each of the master cut solenoid valves 252A and 252B, the hydraulic pipes L11 and L21, each of the holding solenoid valves 253FL, 253FR, 253RL and 253RR and the hydraulic pipes L12, L13, L22 and L23. Therefore, the master cylinder pressure Pmc, which is the operating pressure applied to the brake oil by the master cylinder 22, directly acts on each of the wheel cylinders 26FL, 26FR, 26RL and 26RR as the wheel cylinder pressure Pwc. This makes it possible to control the wheel cylinder pressure Pwc acting on each of the wheel cylinders 26FL, 26FR, 26RL and 26RR according to the master cylinder pressure Pmc. Meanwhile, when the master cylinder pressure Pmc applied to the brake oil by the master cylinder 22 decreases, the wheel cylinder pressure Pwc also decreases. At that time, the brake oil in each of the wheel cylinders 26FL, 26FR, 26RL and 26RR is returned to the master cylinder 22 through the hydraulic pipes L12, L13, L22 and L23, each of the holding solenoid valves 253FL, 253FR, 253RL and 253RR, the hydraulic pipes L11 and L12, each of the master cut solenoid valves 252A and 252B and the hydraulic pipes L10 and L20, and is stored in the reservoir 23.

Then, the brake actuator 25 can apply the pressurized pressure Pp to the brake oil in the booster mode. In the brake actuator 25, for example, when opening of the master cut solenoid valves 252A and 252B is controlled based on the command current value from the brake ECU 28 and the opening decreases from a fully opened state, and the driving motor 259 for driving the pressurizing pumps 256A and 256B is drive-controlled based on the drive command value from the brake ECU 28, the brake oil is introduced from the upstream side of each of the master cut solenoid valves 252A and 252B, that is to say, from the hydraulic pipes L10 and L20 to each of the reservoirs 255A and 255B through the hydraulic pipes L16 and L26. The brake oil introduced into each of the reservoirs 255A and 255B is inhaled and pressurized by the pressurizing pumps 256A and 256B, and fills up each of the wheel cylinders 26FL, 26FR, 26RL and 26RR through the hydraulic pipes L17, L27, L11 and L21, each of the holding solenoid valves 253FL, 253FR, 253RL and 253RR and the hydraulic pipes L12, L13, L22 and L23. Herein, each of the master cut solenoid valves 252A and 252B adjusts the differential pressure between the brake oil on the down stream side of each of the master cut solenoid valves 252A and 252B, that is to say, the wheel cylinder pressure Pwc acting on each of the wheel cylinders 26FL, 26FR, 26FL and 26RR, and the brake oil on the upstream side of each of the master cut solenoid valves 252A and 252B, that is to say, the master cylinder pressure Pmc generated by the master cylinder 22, as the pressurized pressure Pp, so that the wheel cylinder pressure Pwc is obtained by adding up the master cylinder pressure Pmc and the pressurized pressure Pp. That is to say, the total pressure of the master cylinder pressure Pmc and the pressurized pressure Pp acts on each of the wheel cylinders 26FL, 26FR, 26RL and 26RR as the wheel cylinder pressure Pwc.

The brake actuator 25 is controlled by the brake ECU 28 such that the master cut solenoid valves 252A and 252B are in the non-energizing state, each of the holding solenoid valves 253FL, 253FR, 253RL and 253RR are in the energizing state, each of the decompression solenoid valves 254FL, 254FR, 254RL and 254RR are in the non-energizing state, and each of the pressurizing pumps 256A and 256B are in the non-driving state, in a holding mode. That is to say, in the holding mode of the brake actuator 25, the brake oil is held between each of the holding solenoid valves 253FL, 253FR, 253RL and 253RR and each of the wheel cylinders 26FL, 26FR, 26RL and 26RR, respectively, so that the wheel cylinder pressure Pwc acting on each of the wheel cylinders 26FL, 26FR, 26RL and 26RR can be maintained constant.

The brake actuator 25 is controlled by the brake ECU 28 such that the master cut solenoid valves 252A and 252B are in the non-energizing state, each of the holding solenoid valves 253FL, 253FR, 253RL and 253RR are in the energizing state, each of the decompression solenoid valves 254FL, 254FR, 254RL and 254RR are in the energizing state, and each of the pressurizing pumps 256A and 256B are in the non-driving state, in the decompression mode. That is to say, in the decompression mode of the brake actuator 25, the brake oil held between the holding solenoid valves 253FL, 253FR, 253RL and 253RR and the wheel cylinders 26FL, 26FR, 26RL and 26RR, respectively, is recovered in the reservoirs 255A and 255B through the hydraulic pipes L14 and L24 and the hydraulic pipes L15 and L25 and is stored, so that the wheel cylinder pressure Pwc acting on each of the wheel cylinders 26FL, 26FR, 26RL and 26RR can be decreased. This allows the brake actuator 25 to perform antilock brake control to inhibit any of the wheels 105 from locking and slipping relative to a road surface.

Meanwhile, the brake actuator 25 can pressurize the brake oil by the brake ECU 28 even in a case in which the driver does not operate the brake pedal 21. At that time, when the brake actuator 25 is controlled by the brake ECU 28 to realize the above-described holding mode and decompression mode, the wheel cylinder pressure Pwc acting on each of the wheel cylinders 26FL, 26FR, 26RL and 26RR may be adjusted. This allows the brake actuator 25 to perform traction control to inhibit the slip relative to the road surface when any of the front and rear wheels transmits the driving force to the road surface, and vehicle stability control (VSC) to inhibit a skid of any of the front and rear wheels during turn of the hybrid vehicle 100.

Next, the hydraulic braking units 27FL, 27FR, 27RL and 27RR are the braking force generating means, and are provided with the brake pads 271FL, 271FR, 271RL and 271RR and the brake rotors 272FL, 272FR, 272RL and 272RR together with the wheel cylinders 26FL, 26R, 26RL and 26RR, respectively. The hydraulic braking units 27FL, 27FR, 27RL and 27RR are to generate the pressure braking force by action of the wheel cylinder pressure Pwc, which is the pressure of the brake oil filled up to each of the wheel cylinders 26FL, 26FR, 26RL and 26RR, that is to say, the total pressure of the master cylinder pressure Pmc and the pressurized pressure Pp.

Then, in the hybrid vehicle 100, the wheel cylinder 26FR, the brake pad 271FR and the brake rotor 272FR are provided on the right front wheel, the wheel cylinder 26RL, the brake pad 271RL and the brake rotor 272RL are provided on the left rear wheel, the wheel cylinder 26FL, the brake pad 271FL and the brake rotor 272FL are provided on the left front wheel, and the wheel cylinder 26RR, the brake pad 271RR and the brake rotor 272RR are provided on the right rear wheel. That is to say, the pipes of the hydraulic brake apparatus 2 are arranged with cross piping relative to each of the wheels 105 (refer to FIG. 2). Each of the wheel cylinders 26FL, 26FR, 26RL and 26RR is to allow each of the brake pads 271FL, 271FR, 271RL and 271RR to contact each of the brake rotors 272FL, 272FR, 272RL and 272RR facing on each of the brake pads 271FL, 271FR, 271RL and 271RR and integrally rotating with each of the wheels 105 by the action of the wheel cylinder pressure Pwc, and generate the pressure braking force by frictional force generated between each of the brake pads 271FL, 271FR, 271RL and 271RR and each of the brake rotors 272FL, 272FR, 272RL and 272RR, respectively. Meanwhile, each of the brake pads 271FR and 271FL and the brake rotors 272FR and 272FL provided on the right and left front wheels are configured to generate the frictional force larger than that generated between each of the brake pads 271RR and 271RL and the brake rotors 272RR and 272RL provided on the right and left rear wheels, respectively, when the same wheel cylinder pressure Pwc acts on each of the wheel cylinders 26FL, 26FR, 26RL and 26RR.

Herein, in the braking apparatus 1 of this embodiment, the braking force according to the master cylinder pressure Pmc by the master cylinder 22 is referred to as master pressure braking force, and the braking force according to the differential pressure between the wheel cylinder pressure Pwc, which should act on each of the wheel cylinders 26FL, 26FR, 26RL and 26RR, and the master cylinder pressure Pmc, that is to say, the braking force according to the pressurized pressure Pp by the pressurizing pumps 256A and 256B of the brake actuator 25 is referred to as differential pressure braking force. That is to say, the hydraulic brake apparatus 2 can generate the pressure braking force obtained by adding up the master pressure braking force according to the master cylinder pressure Pmc and the differential pressure braking force according to the pressurized pressure Pp. In further other words, the hydraulic brake apparatus 2 can generate predetermined pressure braking force obtained by adding up the master pressure braking force and the differential pressure braking force as the braking force according to the wheel cylinder pressure Pwc as the total pressure of the master cylinder pressure Pmc and the pressurized pressure Pp. Then, the braking apparatus 1 can generate the braking force obtained by adding up the pressure braking force obtained by adding up the master pressure braking force and the differential pressure braking force by the hydraulic brake apparatus 2 and the regenerative braking force by the regenerative braking apparatus 3, in the hybrid vehicle 100, as shown in FIG. 4.

The brake ECU 28 is configured centering on a microcomputer for controlling each unit of the braking apparatus 1 such as the brake actuator 25 according to the operating state of the braking apparatus 1 and the hybrid vehicle 100 equipped with the braking apparatus 1. That is to say, the brake ECU 28 is electrically connected to various sensors provided on each unit, which are herein a stroke sensor 28a, a negative pressure sensor 28b and a master cylinder pressure sensor 28c, to execute the brake control by executing a brake control program based on a pedal stroke of the brake pedal 21 and the master cylinder pressure Pmc detected by the various sensors.

Herein, the stroke sensor 28a is operating amount detecting means for detecting a depression amount (operating amount) when the brake pedal 21 is depressed by the driver, that is to say, a pedal stroke St of the brake pedal 21. The stroke sensor 28a is connected to the brake ECU 28, and the pedal stroke St of the brake pedal 21 detected by the stroke sensor 28a is output to the brake ECU 28.

The negative pressure sensor 28b is provided in the middle of the negative pressure pipe 241. That is to say, the negative pressure sensor 28b is to detect the pressure in the negative pressure pipe 241 as a negative pressure Pv. The negative pressure sensor 28b is connected to the brake ECU 28, and the negative pressure Pv detected by the negative pressure sensor 28b is output to the brake ECU 28.

The master cylinder pressure sensor 28c is operating pressure detecting means for detecting the operating pressure, that is to say, the master cylinder pressure Pmc. The master cylinder pressure sensor 28c is provided in the middle of the hydraulic pipe L10 connecting the master cylinder 22 and the master cut solenoid valve 252A of the brake actuator 25. That is to say, the master cylinder pressure sensor 28c is to detect the pressure of the brake oil in the hydraulic pipe L10 as the operating pressure, that is to say, the master cylinder pressure Pmc. The master cylinder pressure sensor 28c is connected to the brake ECU 28, and the master cylinder pressure Pmc detected by the master cylinder pressure sensor 28c is output to the brake ECU 28.

In the braking apparatus 1 thus configured, when the driver operates the brake pedal 21 and the pedal force is input to the brake pedal 21, the pedal force is transmitted to the brake booster 24 through the operating rod. Then, the pedal force transmitted to the brake booster 24 is redoubled by the brake booster 24 with a predetermined redouble ratio to be transmitted to the master cylinder 22. The pedal force redoubled by the brake booster 24 and is transmitted to the master cylinder 22 is converted to the master cylinder pressure Pmc, which is the braking hydraulic pressure, by the master cylinder 22, and is transmitted to the wheel cylinders 26FL, 26FR, 26RL and 26RR through the brake actuator 25. At that time, the wheel cylinder pressure Pwc, which is the braking hydraulic pressure to be supplied to the wheel cylinders 26FL, 26FR, 26RL and 26RR, is adjusted to a predetermined hydraulic pressure by the brake actuator 25 and is transmitted to the wheel cylinders 26FL, 26FR, 26RL and 26RR. Then, in the wheel cylinders 26FL, 26FR, 26RL and 26RR, the brake pads 271FL, 271FR, 271RL and 271RR and the brake rotors 272FL, 272FR, 272RL and 272RR composing the hydraulic braking units 27FL, 27FR, 27RL and 27RR, respectively, the predetermined wheel cylinder pressure Pwc acts on each of the wheel cylinders 26FL, 26FR, 26RL and 26RR and the brake pads 271FL, 271FR, 271RL and 271RR are pressed against the brake rotors 272FL, 272FR, 272RL and 272RR, thereby the pressure braking force (pressure braking torque) acts by the frictional force to decelerate the rotation of the brake rotors 272FL, 272FR, 272RL and 272RR. As a result, the rotation of the wheels can be decelerated by the deceleration of the brake rotors 272FL, 272FR, 272RL and 272RR.

During this time, the brake ECU 28 controls the master cut solenoid valves 252A and 252B, the holding solenoid valves 253FL, 253FR, 253RL and 253RR, the decompression solenoid valves 254FL, 254FR, 254RL and 254RR, and the pressurizing pumps 256A and 256B of the brake actuator 25, thereby adjusting the pressurized pressure Pp to adjust the wheel cylinder pressure (braking hydraulic pressure) Pwc to the wheel cylinders 26FL, 26FR, 26RL and 26RR, and allows the predetermined pressure braking force to act on the wheels, thereby decelerating the rotation of the wheels. Also, the brake ECU 28 controls the regenerative braking apparatus 3 by means of the main ECU 4, the motor ECU 111 and the like and allows the predetermined regenerative braking force to act on the wheels, thereby decelerating the rotation of the wheels.

For example, the brake ECU 28 detects the driver required braking force according to the pedal stroke St (operating amount) of the brake pedal 21 and the master cylinder pressure Pmc of the master cylinder 22 obtained by the same, and outputs the required regenerative braking force based on the driver required braking force to the main ECU 4. The main ECU 4 outputs the required regenerative braking force based on the driver required braking force to the motor ECU 111, and the motor ECU 111 controls the regenerative brake based on the required regenerative braking force and outputs an executed value, that is to say, effective regenerative braking force, which is the regenerative braking force actually executed, to the main ECU 4. The main ECU 4 outputs the effective regenerative braking force to the brake ECU 28, and the brake ECU 28 sets required pressure braking force based on the driver required braking force and the effective regenerative braking force, and controls the brake actuator 25 based on the required pressure braking force to operate the hydraulic braking unit 27. Meanwhile, herein, the effective regenerative braking force is the regenerative braking force, which can be actually generated by the regenerative braking apparatus 3 based on the required regenerative braking force, the rotational number of the electric motor 102, and a state of charge of the battery 109.

Herein, as described above, the braking apparatus 1 of this embodiment applied to the hybrid vehicle 100 detects the driver required braking force based on the pedal stroke St and the master cylinder pressure Pmc, and distributes the driver required braking force to the pressure braking force by the hydraulic braking units 27FL, 27FR, 27RL and 27RR of the hydraulic brake apparatus 2 and the regenerative braking force by the electric motor 102 of the regenerative braking apparatus 3. In this case, when the brake pedal 21 is depressed, and the vehicle speed lowers and the regenerative braking force gradually lowers from a state in which the driver required braking force is ensured by the pressure braking force by the hydraulic braking units 27FL, 27FR, 27RL and 27RR, more specifically, by the master pressure braking force according to the master cylinder pressure Pmc and the regenerative braking force by the electric motor 102, the brake ECU 28 pressurizes the brake oil by operating the pressurizing pumps 256A and 256B to increase the pressure braking force by the hydraulic braking units 27FL, 27FR, 27RL and 27RR, more specifically, the differential pressure braking force according to the pressurized pressure Pp, and executes the switching control of the braking force so as to ensure the driver required braking force only by the pressure braking force by the hydraulic braking units 27FL, 27FR, 27RL and 27RR, that is to say, by the master pressure braking force and differential pressure braking force.

Incidentally, although the above-described in-line system braking apparatus 1 is not expensive, this returns the brake oil to the reservoir 23 and inhales the brake oil from the master cylinder 22 side in an early stage of the pressurization of the brake oil by the operation of the pressurizing pumps 256A and 256B, so that feeling of the braking operation might be deteriorated.

That is to say, for example, when the speed of the hybrid vehicle 100 lowers from a braking state in which the driver required braking force is ensured by the master pressure braking force, which is the pressure braking force according to the master cylinder pressure Pmc, and the regenerative braking force, the regenerative braking force gradually lowers, so that the switching control to switch the regenerative braking force to the differential pressure braking force, which is the pressure braking force according to the pressurized pressure Pp by the pressurizing pumps 256A and 256B, is executed by pressurizing the brake oil by operating the pressurizing pumps 256A and 256B. That is to say, in the in-line system braking apparatus 1, it is required to increase or decrease the wheel cylinder pressure Pwc in order to increase or decrease the pressure braking force, and when the depression amount of the brake pedal 21 by the driver is constant, the master pressure braking force according to the master cylinder pressure Pmc is constant, so that the pressurization of the brake oil by the pressurizing pumps 256A and 256B is increased or decreased by controlling the pressurizing pumps 256A and 256B. Then, in order to increase or decrease the pressurization of the brake oil by the pressurizing pumps 256A and 256B, the brake oil is returned to the reservoir 23 or the brake oil is inhaled from the master cylinder 22 side, so that shock due to variation of the hydraulic pressure might occur in the brake pedal 21 basically directly coupled to the master cylinder 22, such as push back of the brake pedal 21 to the driver side or pull-in of the same to the master cylinder 22 side. As a result, the driver might feel discomfort in the operation of the brake pedal 21, so that the feeling of the braking operation might be deteriorated.

Then, the braking apparatus 1 of this embodiment is provided with the above-described brake ECU 28 as controlling means to reduce control target braking force, which is target braking force obtained by adding up the regenerative braking force and the differential pressure braking force according to the pressurized pressure Pp when the brake pedal 21 is returned at the time of the switching control, and to prohibit the increase in the pressurized pressure Pp by the brake actuator 25 by setting the control target braking force to be a value smaller than a last control target braking force when the brake pedal 21 is held or further depressed after the brake pedal 21 is returned. Then, in the braking apparatus 1, even when the brake pedal 21 is held or further depressed after the brake pedal 21 is returned at the time of the switching control, the brake ECU 28 prohibits the increase in the pressurized pressure Pp by the brake actuator 25 to ensure predetermined braking force by the master pressure braking force, thereby minimizing hydraulic pressure variation of the brake oil by the pressurization of the brake actuator 25 while ensuring appropriate braking force, and inhibiting the braking operation feeling from being deteriorated.

Specifically, in the braking apparatus 1, as shown in FIG. 1, a driver required braking force setting unit 291a, a required regenerative reference braking force setting unit 291b, a control target braking force setting unit 291c, a required regenerative braking force setting unit 291d, a required differential pressure braking force setting unit 291e, a valve opening controlling unit 291f, and a pump drive controlling unit 291g are provided on the brake ECU 28 as the controlling means.

Herein, the brake ECU 28 is configured centering on the microcomputer and has a processing unit 291, a memory unit 292 and an input/output unit 293 connected to one another, which can exchange the signals with one another. A drive circuit not shown for driving each unit of the braking apparatus 1, and various sensors such as the above-described stroke sensor 28a, negative pressure sensor 28b, master cylinder pressure sensor 28c are connected to the input/output unit 293, and the input/output unit 293 inputs and outputs the signals to and from the sensors or the like. Also, a computer program for controlling each unit of the braking apparatus 1 is stored in the memory unit 292. The memory unit 292 can be composed of a hard disk device, a magneto-optical disk device, a non-volatile memory (a memory medium only capable of reading, such as a CD-ROM) such as a flash memory and a volatile memory such as a random access memory (RAM), or a combination thereof. The processing unit 291 is composed of a memory not shown and the central processing unit (CPU), and has the above-described driver required braking force setting unit 291a, required regenerative reference braking force setting unit 291b, control target braking force setting unit 291c, required regenerative braking force setting unit 291d, required differential pressure braking force setting unit 291e, valve opening controlling unit 291f, and pump drive controlling unit 291g. The brake control of the braking apparatus 1 described with reference to FIG. 8 is executed by the processing unit 291 reading the computer program in the memory incorporated in the processing unit 291 to calculate and transmitting a control signal according to a result of the calculation, based on the detection result by the sensor provided on each unit. At that time, the processing unit 291 appropriately stores a partially-calculated numeric value in the memory unit 292, and executes the calculation by bringing out the stored numeric value. Meanwhile, when controlling the braking apparatus 1, this may be controlled by a dedicated hardware different from that of the brake ECU 28 in place of the computer program.

The drive required braking force setting unit 291a is driver required braking force setting means, and sets the driver required braking force based on the operation of the brake pedal 21 by the driver. Herein, the driver required braking force is the braking force required by the driver according to the operation of the brake pedal 21. The driver required braking force setting unit 291a calculates the driver required braking force from the master cylinder pressure Pmc detected by the master cylinder pressure sensor 28c, based on a driver required braking force map as shown in FIG. 5 memorized in the memory unit 292, for example.

That is to say, the driver required braking force map shown in FIG. 5 is based on the driver required braking force DriverFx and the master cylinder pressure Pmc, and shows a correspondence relationship between the driver required braking force DriverFx and the master cylinder pressure Pmc. In the driver required braking force map, it is set that the driver required braking force DriverFx is set so as to increase in association with the increase in the master cylinder pressure Pmc.

Meanwhile, although it is described on the assumption that the driver required braking force setting unit 291a of this embodiment sets the driver required braking force DriverFx based on the driver required braking force map shown in FIG. 5 and the detected master cylinder pressure Pmc, this is not limited to this case, and the driver required braking force DriverFx may be set by using another setting method. The driver required braking force setting unit 291a may, for example, set the driver required braking force DriverFx, based on a map based on the master cylinder pressure Pmc and the negative pressure Pv detected by the negative pressure sensor 28b. The driver required braking force map based on the driver required braking force DriverFx, the master cylinder pressure Pmc and the negative pressure Pv may be set such that the driver required braking force Driver Fx is set so as to increase with the same master cylinder pressure Pmc in association with decrease in the negative pressure Pv, for example.

Also, as described above, since the pressurizing pumps 256A and 256B inhale the brake oil from the master cylinder 22 side, the master cylinder pressure Pmc might temporarily lower when driving the pressurizing pumps 256A and 256B, for example. Herein, since the driver required braking force is set based on the master cylinder pressure Pmc, when the master cylinder pressure Pmc lowers, the driver required braking force also is set to be lower, and the drivability might be deteriorated due to the change in the deceleration irrespective of the brake requirement of the driver, for example. That is to say, when the pressurizing pumps 256A and 256B operate to increase the pressurized pressure Pp of the brake oil while the regenerative braking force lowers, since the pressurizing pumps 256A and 256B inhale the brake oil from the master cylinder 22 side, the master cylinder pressure Pmc temporarily lowers, and the relationship between a current master cylinder pressure Pmc and actual driver required braking force by the driver might shift. Therefore, the driver required braking force setting unit 291a may change (correct) the driver required braking force based on the master cylinder pressure Pmc, by taking account of the decrease in the master cylinder pressure Pmc due to the operation of the pressurizing pumps 256A and 256B, according to the pedal stroke St of the brake pedal 21 detected by the stroke sensor 28a, at the time of setting of the driver required braking force, for example. This allows the driver required braking force setting unit 291a to set more appropriate driver required braking force, so that higher-accuracy braking force control can be realized, and the drivability can be improved.

The required regenerative reference braking force setting unit 291b is required regenerative reference braking force setting means for setting required regenerative reference braking force ReferenceFx based on the driver required braking force and the master cylinder pressure Pmc detected by the master cylinder pressure sensor 28c. Herein, the required regenerative reference braking force ReferenceFx is a reference of a request of the regenerative braking force to the regenerative braking apparatus 3, and is a maximum regenerative braking force, which can be covered by the regenerative braking force of the regenerative braking apparatus 3, relative to the driver required braking force. That is to say, the required regenerative reference braking force setting unit 291b can set the required reference regenerative braking force ReferenceFx as the maximum regenerative braking force, which can be covered by the regenerative braking force of the regenerative braking apparatus 3, relative to the driver required braking force, by subtracting the master pressure braking force PmcFx according to the master cylinder pressure Pmc detected by the master cylinder pressure sensor 28c from the driver required braking force DriverFx set by the driver required braking force setting unit 291a, for example.

The control target braking force setting unit 291c is control target braking force setting means for setting control target braking force TargetFx. Herein, the control target braking force TargetFx is target braking force obtained by adding up the regenerative braking force of the regenerative braking apparatus 3 and the differential pressure braking force according to the pressurized pressure Pp of the hydraulic brake apparatus 2.

The required regenerative braking force setting unit 291d is required regenerative braking force setting means for setting the required regenerative braking force. Herein, the required regenerative braking force is the regenerative braking force required to the regenerative braking apparatus 3 according to the control target braking force TargetFx.

The required differential pressure braking force setting unit 291e is required differential pressure braking force setting means for setting the required differential pressure braking force. Herein, the required differential pressure braking force corresponds to the above-described required pressure braking force, and is the differential pressure braking force required to the hydraulic brake apparatus 2 according to the control target braking force TargetFx.

That is to say, the required regenerative braking force setting unit 291d and the required differential pressure braking force setting unit 291e set the braking force required to the regenerative braking apparatus 3 and the hydraulic brake apparatus 2 for realizing the control target braking force TargetFx set by the control target braking force setting unit 291c as the required regenerative braking force and the required differential pressure braking force, respectively.

The valve opening controlling unit 291f and the pump drive controlling unit 291g are pressurization controlling means, for controlling the brake actuator 25 so as to realize the required differential pressure braking force based on the required differential pressure braking force.

That is to say, the valve opening controlling unit 291f is to perform opening control of each of the master cut solenoid valves 252A and 252B. The valve opening controlling unit 291f performs the opening control of each of the master cut solenoid valves 252A and 252B, based on the required differential pressure braking force set by the required differential pressure braking force setting unit 291e so as to realize the required differential pressure braking force, in other words, by setting the command current value based on the required pressurized pressure Pp and based on the set command current value.

The pump drive controlling unit 291g is to drive each of the pressurizing pumps 256A and 256B by drive-controlling the driving motor 259. The pump drive controlling unit 291g drives each driving motor 259 to perform the drive control of the pressurizing pumps 256A and 256B, based on the required differential pressure braking force set by the above-described required differential pressure braking force setting unit 291e so as to realize the required differential pressure braking force, in other words, by setting the command current value based on the required pressurized pressure Pp and based on the set command current value.

Then, the required regenerative braking force set by the required regenerative braking force setting unit 291d is output to the motor ECU 111 through the main ECU 4, and the motor ECU 111 controls the regenerative braking apparatus 3 based on the required regenerative braking force.

Herein, FIG. 6 is a time chart for illustrating the switching control of the braking force in the braking apparatus 1 according to the embodiment of the present invention.

The control target braking force setting unit 291c sets the required regenerative reference braking force ReferenceFx set by the required regenerative reference braking force setting unit 291b based on the driver required braking force DriverFx as the control target braking force TargetFx before time t1 at which the switching control starts. Also, herein, the required regenerative braking force setting unit 291d sets the required regenerative reference braking force ReferenceFx as the required regenerative braking force. That is to say, the brake ECU 28 sets the required regenerative reference braking force ReferenceFx, the control target braking force TargetFx and the required regenerative braking force to the same value before the time t1 at which the switching control starts. For that reason, the required differential pressure braking force set by the required differential pressure braking force setting unit 291e is set to 0, therefore the hydraulic brake apparatus 2 does not generate the differential pressure braking force according to the pressurized pressure Pp.

Meanwhile, the braking apparatus 1 of this embodiment does not perform the control to compensate the required regenerative reference braking force ReferenceFx before the switching control, in other words, actual regenerative braking force relative to the required regenerative braking force, that is to say, deficient braking force of the effective regenerative braking force EffectiveFx by the differential pressure braking force according to the pressurized pressure Pp of the hydraulic brake apparatus 2. Thereby, the drive of the pressurizing pumps 256A and 256B is inhibited, and it is possible to inhibit the shock due to the hydraulic pressure variation from occurring in the brake pedal 21, so that it is possible to inhibit the feeling of the braking operation from being deteriorated and to improve durability of the hydraulic brake apparatus 2.

On the other hand, in the switching control, the control target braking force setting unit 291c first sets the actual effective regenerative braking force EffectiveFx at the switching control start time t1 as the control target braking force TargetFx. That is to say, the braking apparatus 1 executes the switching control to switch the effective regenerative braking force EfectiveFx at the switching control start time t1 to the differential pressure braking force. The control target braking force setting unit 291c sets the effective regenerative braking force EffectiveFx at the switching control start time t1 as the control target braking force TargetFx without change when the brake pedal 21 is held in a state at the switching control start time t1. Then, the required regenerative braking force setting unit 291d sets the actual effective regenerative braking force EffectiveFx at the switching control start time t1 as the required regenerative braking force, and decreases the required regenerative braking force at a constant decrease gradient and decreases the effective regenerative braking force EffectiveFx. On the other hand, the required differential pressure braking force setting unit 291e sets the required differential pressure braking force by subtracting the required regenerative braking force from the control target braking force TargetFx, that is to say, increases the required differential pressure braking force at a constant increase gradient. As a result, the braking apparatus 1 executes the switching control to switch the regenerative braking force to the differential pressure braking force by the brake ECU 28.

Then, for example, since the driver required braking force DriverFx decreases when the brake pedal 21 is returned back by the driver at time t2 during the switching control, the control target braking force setting unit 291c decreases the control target braking force TargetFx. Therefore, the required differential pressure braking force set by subtracting the required regenerative braking force (=current effective regenerative braking force EffectiveFx) from the control target braking force TargetFx by the required differential pressure braking force setting unit 291e also decreases and the actual differential pressure braking force also decreases. That is to say, when the driver releases the depression on the brake pedal 21 during the switching control and the driver required braking force decreases, it is allowed that the pressurized pressure Pp decreases from the last pressurized pressure Pp.

Herein, the control target braking force setting unit 291c calculates the wheel cylinder pressure Pwc allowed relative to the pedal stroke St, which is the operating amount of the brake pedal 21 at that time (time t2), and subtracts the master pressure braking force PmcFx according to the current master cylinder pressure Pmc from wheel pressure braking force PwcFx according to the allowed wheel cylinder pressure Pwc to set as the control target braking force TargetFx, thereby decreasing the control target braking force TargetFx. Thereby, the control target braking force TargetFx is prevented from drastically decreasing, therefore it is possible to prevent the required differential pressure braking force and the actual differential pressure braking force from drastically decreasing and to allow the same to gradually decrease.

Meanwhile, the control target braking force setting unit 291c calculates the wheel cylinder pressure Pwc allowed relative to the pedal stroke St at that time point from the pedal stroke St detected by the stroke sensor 28a, based on the wheel cylinder pressure map as shown in FIG. 7 memorized in the memory unit 292, for example. That is to say, the wheel cylinder pressure map shown in FIG. 7 is based on the wheel cylinder pressure Pwc and the pedal stroke St and shows the correspondence relationship between the wheel cylinder pressure Pwc and the pedal stroke St. In the wheel cylinder pressure map, it is set that the wheel cylinder pressure Pwc allowed at that time point is set so as to decrease according to the decrease in the pedal stroke St. Meanwhile, the wheel cylinder pressure map is composed of a range in which the correspondence relationship between the pedal stroke St and the allowed wheel cylinder pressure Pwc changes by wear of each of the brake pads 271FL, 271FR, 271RL and 271RR and volume of allowance of components composing the hydraulic brake apparatus 2 due to change with time, and a range in which the correspondence relationship between the pedal stroke St and the allowed wheel cylinder pressure Pwc is such that the wheel cylinder pressure Pwc linearly increases in association with the increase in the pedal stroke St due to rigidity of the components composing the hydraulic brake apparatus 2.

Then, as shown in FIG. 6, for example, the control target braking force setting unit 291c sets the control target braking force TargetFx to a value smaller than the last control target braking force TargetFx when the brake pedal 21 is held or further depressed at time t4 after time t3 at which the required regenerative braking force (=current effective regenerative braking force EffectiveFx) by the regenerative braking apparatus 3 becomes 0, that is to say, at the time t4 after the brake pedal 21 is returned by the driver at the time t2 during the switching control. That is to say, even when the brake pedal 21 is held or further depressed and the driver required braking force DriverFx is held or increased, after the brake pedal 21 is returned at the time t2 during the switching control and the control target braking force TargetFx decreases once, the control target braking force setting unit 291c decreases the control target braking force TargetFx to 0 without increasing the same. For that reason, after the required differential pressure braking force set by the required differential pressure braking force setting unit 291e decreases once together with the control target braking force TargetFx by the return of the brake pedal 21 at the time t2 during the switching control, this decreases from the last value even when the brake pedal 21 is held or further depressed and finally becomes 0. Thereby, after the brake pedal 21 is returned at the time t2 during the switching control and the required differential pressure braking force once decreases together with the control target braking force TargetFx, even when the brake pedal 21 is held or further depressed, the increase in the pressurized pressure Pp by the pressurizing pumps 256A and 256B of the brake actuator 25 is prohibited and the pressurized pressure Pp directly decreases, and as a result, it is possible to inhibit the shock due to the hydraulic pressure variation from generating in the brake pedal 21 during the switching control, thereby inhibiting the feeling of the braking operation from being deteriorated. Then, during the same, even when the driver required braking force DriverFx increases due to the further depression on the brake pedal 21, since the master cylinder pressure Pmc increases due to the further depression on the brake pedal 21, the increased braking force can be covered by the master pressure braking force according to the increased master cylinder pressure Pmc. Therefore, even when the required differential pressure braking force is decreased together with the control target braking force TargetFx to decrease the pressurized pressure Pp, the appropriate braking force can be ensured, so that it is possible to prevent the driver from feeling that the braking force is deficient.

Next, the brake control of the braking apparatus 1 according to this embodiment is described with reference to a flowchart shown in FIG. 8. Meanwhile, this control routine is repeatedly executed with a control cycle of a few ms to several tens of ms. Meanwhile, although all of the following description is that of the calculation on a braking force perspective, the calculation is not limited to this, and it is also possible to calculate by replacing the value with the numeric value according to the braking force.

First, the driver required braking force setting unit 291a of the brake ECU 28 obtains the master cylinder pressure Pmc detected by the master cylinder pressure sensor 28c and the pedal stroke St detected by the stroke sensor 28a, and calculates the driver required braking force DriverFx from the master cylinder pressure Pmc and the stroke sensor 28a based on the driver required braking force map (for example, refer to FIG. 5) memorized in the memory unit 292 to set (S100).

Next, the required regenerative reference braking force setting unit 291b of the brake ECU 28 obtains the driver required braking force DriverFx set by the driver required braking force setting unit 291a at the S100 and the master cylinder pressure Pmc detected by the master cylinder pressure sensor 28c, and calculates the required regenerative reference braking force ReferenceFx based on the driver required braking force DriverFx and the master pressure braking force PmcFx according to the master cylinder pressure PmcFx to set (S102). Herein, the required regenerative reference braking force setting unit 291b can calculate the required regenerative reference braking force ReferenceFx with [ReferenceFx=DriverFx−PmcFx].

Next, the brake ECU 28 obtains a vehicle speed VK0 of the hybrid vehicle 100 from a vehicle speed sensor not shown, and judges whether a current vehicle speed VK0 is not higher than the vehicle speed at the time of the switching start (S104). When it is judged that the current vehicle speed VK0 is higher than the vehicle speed at the time of the switching start (S104: No), the brake ECU 28 sets as [TargetFx=ReferenceFx] by the control target braking force setting unit 291c, and sets the required regenerative reference braking force ReferenceFx set by the required regenerative reference braking force setting unit 291b at the S102 as the control target braking force TargetFx (S116). Thereafter, the brake ECU 28 sets as [TargetFxLast=TargetFx], saves this control target braking force TargetFx in the memory unit 292 as a last control target braking force TargetFxLast, and shifts to a next control period.

When it is judged that the current vehicle speed VK0 is not higher than the vehicle speed at the time of the switching start (S104: Yes), the brake ECU 28 executes the switching control based on the control target braking force TargetFX set by the control target braking force setting unit 291c (S106). Meanwhile, the control target braking force setting unit 291c sets the actual effective regenerative braking force EffectiveFx at the switching control start time t1 as the control target braking force TargetFx at the time of the switching control start. Also, at that time, the brake ECU 28 saves the actual effective regenerative braking force EffectiveFx at the switching control start time t1 in the memory unit 292 as a memory value EffectiveFxMemory.

Next, the brake ECU 28 judges a current state of the brake pedal 21 based on the pedal stroke St detected by the stroke sensor 28a and the master cylinder pressure Pmc detected by the master cylinder pressure sensor 28c (S108).

When it is judged that the current state of the brake pedal 21 is held as the state at the time of switching start (S108: when held as the state at the switching start), the brake ECU 28 sets as [TargetFx=EffectiveFxMemory] by the control target braking force setting unit 291c and continuously sets the memory value EffectiveFxMemory saved in the storing unit 292, that is to say, the actual effective regenerative braking force EffectiveFx at the switching control start time t1 as the control target braking force TargetFx (S110) Thereafter, the brake ECU 28 sets as [TargetFxLast=TargetFx], saves this control target braking force TargetFx in the memory unit 292 as the last control target braking force TargetFxLast (S118), and shifts to a next control cycle.

When it is judged that the current state of the brake pedal 21 is the state returned from the state of the switching start (S108: when returned), the brake ECU 28 calculates the wheel cylinder pressure Pwc allowed relative to the pedal stroke St from the pedal stroke St at the present time detected by the stroke sensor 28a based on the wheel cylinder pressure map (for example, refer to FIG. 7) memorized in the memory unit 292 by the control target braking force setting unit 291c, sets as [TargetFx=PwcFx−PmcFx], and subtracts the master pressure braking force PmcFx according to the current master cylinder pressure Pmc from the wheel pressure braking force PwcFx according to the allowed wheel cylinder pressure Pwc to set as the control target braking force TargetFx (S112). Thereafter, the brake ECU 28 sets as [TargetFxLast=TargetFx], saves this control target braking force TargetFx in the memory unit 292 as the last control target braking force TargetFxLast (S118), and shifts to a next control cycle.

When it is judged that the current state of the brake pedal 21 is the state held or further depressed after returned once from the state of the switching start (S108: when further depressed and held after returned once), the brake ECU 28 sets as [TargetFx=TargetFxLast−K] by the control target braking force setting unit 291c and sets the control target braking force TargetFx to be a value smaller than the last control target braking force TargetFxLast (S114). Herein, [K] is a subtraction term set in advance in order to set the control target braking force TargetFx to be the value smaller than the last control target braking force TargetFxLast. Thereafter, the brake ECU 28 sets as [TargetFxLast=TargetFx], saves this control target braking force TargetFx in the memory unit 292 as the last control target braking force TargetFxLast (S118), and shifts to a next control cycle.

The braking apparatus 1 according to the above-described embodiment of the present invention is provided with the hydraulic brake apparatus 2 having the master cylinder 22 for applying the master cylinder pressure (operating pressure) Pmc to the brake oil (working fluid) according to the operation of the brake pedal 21, the brake actuator 25 for pressurizing the brake oil to apply the pressurized pressure Pp to the brake oil, and the hydraulic braking units 27FL, 27FR, 27RL and 27RR for generating the pressure braking force on the wheels 105, which the hybrid vehicle 100 has, by the wheel cylinder pressure Pwc obtained by adding up the master cylinder pressure Pmc and the pressurized pressure Pp; the regenerative braking apparatus 3 for generating the regenerating braking force on the wheels 105; and the brake ECU 28 for executing the switching control to switch the regenerative braking force to the differential pressure braking force, which is the pressure braking force according to the pressurized pressure, and at the time of the switching control, reducing the control target braking force, which is the target braking force obtained by adding up the regenerative braking force and the differential pressure braking force according to the pressurized pressure, when the brake pedal 21 is returned to set the control target braking force to be the value smaller than the last control target braking force when the brake pedal 21 is held or further depressed after the brake pedal 21 is returned, thereby prohibiting the increase in the pressurized pressure by the brake actuator 25.

Therefore, even when the brake pedal 21 is held or further depressed after the brake pedal 21 is returned at the time of the switching control, the brake ECU 28 sets the control target braking force to be the value smaller than the last control target braking force, prohibits the increase in the pressurized pressure by the brake actuator 25 to decrease the pressurized pressure, and ensures the predetermined braking force by the master pressure braking force, which is the pressure braking force according to the master cylinder pressure Pmc, so that it is possible to inhibit the hydraulic pressure variation of the brake oil due to the pressurization of the brake actuator 25 while ensuring the appropriate braking force, and thereby the braking operation feeling is inhibited from deteriorating. Also, the control when the brake pedal 21 is returned at the switching control can be introduced more simply and smoothly.

Further, according to the braking apparatus 1 according to the above-described embodiment of the present invention, the hydraulic brake apparatus 2 increases the master cylinder pressure Pmc when the brake pedal 21 is further depressed after the brake pedal 21 is returned at the time of the switching control. Therefore, even when the increase in the pressurized pressure by the brake actuator 25 is prohibited and the pressurized pressure decreases when the brake pedal 21 is further depressed after the brake pedal 21 is returned at the time of the switching control, the increased driver required braking force due to the further depression of the brake pedal 21 can be surely covered by the master pressure braking force according to the master cylinder pressure Pmc increased by the further depression of the brake pedal. As a result, the appropriate braking force can be ensured, and it is possible to prevent the driver from feeling that the braking force is deficient.

Further, the braking apparatus 1 according to the embodiment of the present invention described above is provided with the stroke sensor 28a for detecting the pedal stroke of the brake pedal 21 and the master cylinder pressure sensor 28c for detecting the master cylinder pressure, and the brake ECU 28 sets the control target braking force based on the difference between the wheel pressure braking force, which is the pressure braking force according to the wheel cylinder pressure allowed relative to a current pedal stroke of the brake pedal 21, and the master pressure braking force, which is the pressure braking force according to the current master cylinder pressure, when the brake pedal 21 is returned after the switching control start.

Therefore, the brake ECU 28 calculates the wheel cylinder pressure allowed relative to the pedal stroke at that time when the brake pedal 21 is returned after the switching control start, and subtracts the master pressure braking force according to the current master cylinder pressure from the wheel pressure braking force according to the allowed wheel cylinder pressure to set as the control target braking force, so that it is possible to prevent the drastic decrease in the control target braking force and the drastic decrease in the required differential pressure braking force and the actual differential pressure braking force, and to gradually decrease the same.

Meanwhile, the braking apparatus according to the above-described embodiment of the present invention is not limited to the above-described embodiment, and various modifications may be made within the scope of claims.

INDUSTRIAL APPLICABILITY

As described above, the braking apparatus according to the present invention can inhibit the deterioration of the braking operation feeling while ensuring the braking force, and is suitable for being used in various braking apparatuses.

The invention claimed is:

1. A braking apparatus, comprising:
a pressure braking unit including
an operating pressure applying unit that applies an operating pressure to a working fluid according to operation of an operating member,
a pressurizing unit that pressurizes the working fluid to apply a pressurized pressure to the working fluid, and
a braking force generating unit that generates pressure braking force on wheels of a vehicle by a total pressure of the operating pressure and the pressurized pressure;
a regenerative braking unit that generates regenerative braking force on the wheels; and
a controlling unit that executes switching control to switch the regenerative braking force to the pressure braking force according to the pressurized pressure,
wherein, upon execution of the switching control, the controlling unit reduces control target braking force, which is a target braking force obtained by adding the regenerative braking force and the pressure braking force according to the pressurized pressure when the operating member is returned, and sets the control target braking force to be a value less than a previous control target braking force when the operating member is held or further depressed after the operating member is returned, thereby prohibiting increase in the pressurized pressure by the pressurizing unit.

2. The braking apparatus according to claim 1, wherein the pressure braking unit increases the operating pressure when the operating member is further depressed after the operating member is returned upon execution of the switching control.

3. The braking apparatus according to claim 1, further comprising:
an operating amount detecting unit that detects an operating amount of the operating member; and
an operating pressure detecting unit that detects the operating pressure,
wherein the controlling unit sets the control target braking force based on a difference between the pressure braking force according to a total pressure allowed relative to a current operating amount of the operating member and the pressure braking force according to a current operating pressure, when the operating member is returned after start of the switching control.

4. The braking apparatus according to claim 2, further comprising:
an operating amount detecting unit that detects an operating amount of the operating member; and
an operating pressure detecting unit that detects the operating pressure,
wherein the controlling unit sets the control target braking force based on a difference between the pressure braking force according to a total pressure allowed relative to a current operating amount of the operating member and the pressure braking force according to a current operating pressure, when the operating member is returned after start of the switching control.

5. A braking apparatus, comprising:
a hydraulic brake apparatus including
a master cylinder that applies an operating pressure to a working fluid according to operation of a brake pedal,
a brake actuator that pressurizes the working fluid to apply a pressurized pressure to the working fluid, and
a hydraulic braking unit that generates pressure braking force on wheels of a vehicle by a total pressure of the operating pressure and the pressurized pressure;
a regenerative braking apparatus that generates regenerative braking force on the wheels; and
a brake electronic control unit (ECU) that executes switching control to switch the regenerative braking force to the pressure braking force according to the pressurized pressure,
wherein, upon execution of the switching control, the ECU reduces control target braking force, which is a target braking force obtained by adding the regenerative braking force and the pressure braking force according to the pressurized pressure when the brake pedal is returned, and sets the control target braking force to be a value less than a previous control target braking force when the brake pedal is held or further depressed after the brake pedal is returned, thereby prohibiting increase in the pressurized pressure by the brake actuator.

6. The braking apparatus according to claim 1, wherein after the controlling unit sets the control target braking force to be a value less than the previous control target braking force, the controlling unit stores, in a memory unit, the control target braking force as the previous control target braking force.

7. The braking apparatus according to claim 5, wherein after the ECU sets the control target braking force to be a value less than the previous control target braking force, the ECU stores, in a memory unit, the control target braking force as the previous control target braking force.

* * * * *